US011670851B2

(12) United States Patent
Kilpatrick et al.

(10) Patent No.: US 11,670,851 B2
(45) Date of Patent: Jun. 6, 2023

(54) NON-UNIFORMLY THINNED HALF-DUPLEX PHASED ARRAYS WITH DUAL-BAND ANTENNA ELEMENTS

(71) Applicant: Analog Devices International Unlimited Company, Limerick (IE)

(72) Inventors: John A. Kilpatrick, Wakfield, MA (US); Islam A. Eshrah, Giza (EG)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/668,495

(22) Filed: Feb. 10, 2022

(65) Prior Publication Data
US 2022/0271425 A1 Aug. 25, 2022

Related U.S. Application Data

(60) Provisional application No. 63/153,421, filed on Feb. 25, 2021.

(51) Int. Cl.
*H01Q 21/06* (2006.01)
*H01Q 3/34* (2006.01)
(Continued)

(52) U.S. Cl.
CPC .............. *H01Q 3/34* (2013.01); *H01Q 5/342* (2015.01); *H01Q 25/02* (2013.01); *H04L 5/16* (2013.01)

(58) Field of Classification Search
CPC ............ H01Q 3/34; H01Q 5/342; H01Q 5/42; H01Q 25/02; H01Q 21/065; H04L 5/0025
See application file for complete search history.

(56) References Cited

U.S. PATENT DOCUMENTS 7,026,995 B2 * 4/2006 Sreenivas ................ H01Q 1/38
343/893
10,177,459 B2 * 1/2019 Maas ....................... H01Q 5/42
(Continued)

FOREIGN PATENT DOCUMENTS

CN 114902493 * 12/2020

OTHER PUBLICATIONS

Fan et al., *A Low Sidelobe Sparse Array Antenna*, Feb. 21, 2021, IEEE Xplore, 4 pages.
(Continued)

*Primary Examiner* — Awat M Salih
(74) *Attorney, Agent, or Firm* — Knobbe, Martens, Olson & Bear, LLP

(57) ABSTRACT

Phased arrays to be used for Tx and Rx communications in different frequency bands are disclosed. The phased arrays presented herein are non-uniformly thinned half-duplex phased arrays with dual-band antenna elements. Such phased arrays are "half-duplex" in that they are configured for communication in one direction at a time, i.e., either for Tx or for Rx, while utilizing a common array. Such phased arrays are "with dual-band antenna elements" in that, in addition to using antenna elements configured for Tx or for Rx only, they implement some antenna elements that are configured for both Tx and Rx. Such phased arrays are "thinned" in that they are formed according to a method of optimizing array geometry known as "thinning." Such phased arrays are thinned "non-uniformly" in that different antenna elements used for Tx may have different numbers of nearest and/or second-nearest neighbor antenna elements used for Rx, or vice versa.

20 Claims, 11 Drawing Sheets

(51) Int. Cl.
*H04L 5/16* (2006.01)
*H01Q 25/02* (2006.01)
*H01Q 5/342* (2015.01)

(56) References Cited

U.S. PATENT DOCUMENTS

| | | | |
|---|---|---|---|
| 10,714,840 B1* | 7/2020 | West | H01Q 21/30 |
| 11,211,702 B1* | 12/2021 | Mahanfar | H01Q 5/42 |
| 2016/0233588 A1* | 8/2016 | Bily | H01Q 5/42 |
| 2020/0243957 A1* | 7/2020 | Ueda | H01Q 1/38 |
| 2021/0226681 A1* | 7/2021 | Raghavan | H04B 1/0064 |

OTHER PUBLICATIONS

Gal et al., *Optimal Thinning Technigues of Antenna Phased Arrays for Dual Band Operation*, © 2019 IEEE, 2 pages.
Catalani et al., *Development of Enabling Technologies for Ku-Band Airborne SATCOM Phased-Arrays*, MDPI, Electronics 2020, 9, 488, www.mpdi.com/journals/electronics, 15 pages.
Chellapilla et al.., *Optimization of Thinned Phased Arrays Using Evolutionary Programming*, International Conference on Evolutionary Programming, 1998, 10 pages.
*Hexagonal Sampling*, Antenna-Theory.com, Antenna-Theory.com, Feb. 19, 2021, 2 pages.
*Introduction to Antenna Array Geometry*, Antenna-Theory.com , Feb. 19, 2021, 2 pages.
Trampuz et al., *Low Sidelobe Interleaved Transmit-Receive Antennas for FMCW Radar Applications*, © 2019 IEEE, 4 pages.
Sandhu et al., *Radiating Elements for Shared Aperture Tx/Rx Phased Arrays at K/Ka Band*, IEEE Transactions on Antennas and Propagation, Jun. 2016, 14 pages.
Haupt, *Interleaved Thinned Linear Arrays*, IEEE Transactions on Antenna and Propagation, vol. 53, No. 9, Sep. 2005, 7 pages.
*Thinned Antenna Arrays*, Antenna-Theory.com, Feb. 19, 2021, 3 pages.
Gal et al., *Optimization of Thinned Antenna Phased Arrays for Low Sidelobe Level*, 2019 IEEE International Conference on Microwaves, Antennas, Communications and Electronic Systems (COMCAS), 2 pages.

\* cited by examiner

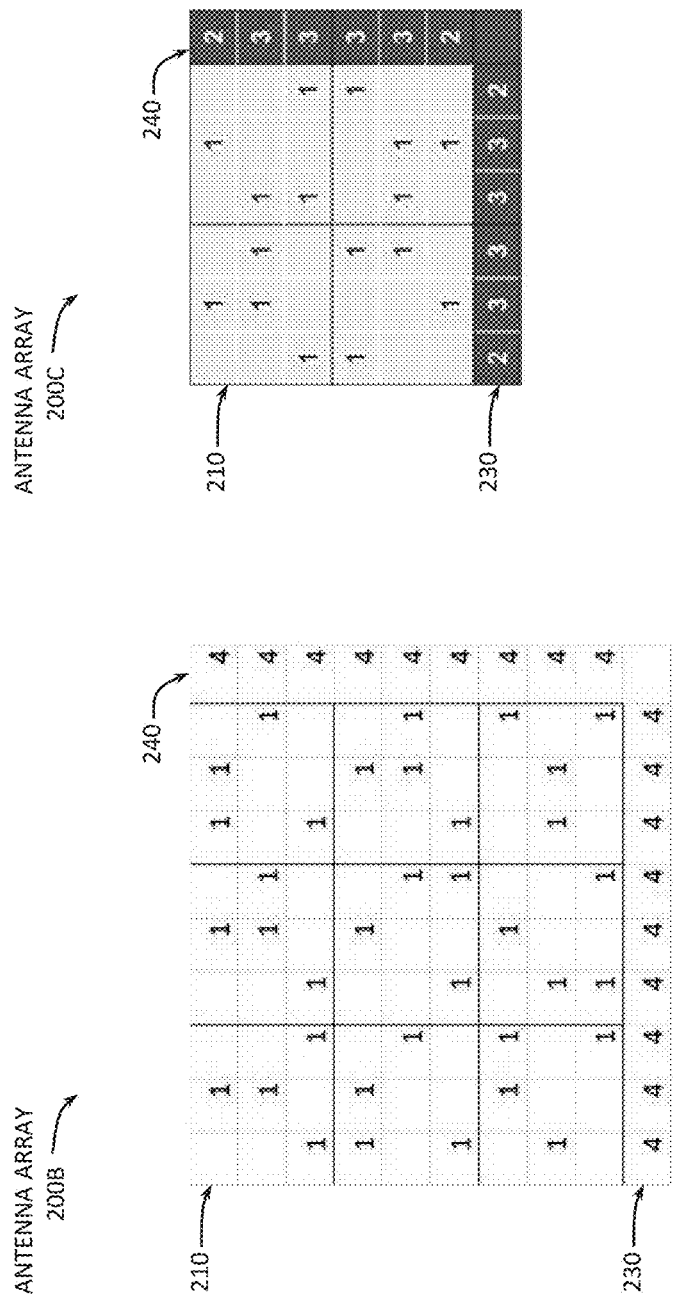

NON-UNIFORMLY THINNED HALF-DUPLEX PHASED ARRAYS WITH DUAL-BAND ANTENNA ELEMENTS

CROSS REFERENCE TO RELATED APPLICATIONS

This application is related to, and claims priority from, U.S. Patent Application No. 63/153,421, filed Feb. 25, 2021, titled "NON-UNIFORMLY THINNED HALF-DUPLEX PHASED ARRAYS WITH DUAL-BAND ANTENNA ELEMENTS," the disclosure of which is hereby incorporated by reference herein in its entirety.

TECHNICAL FIELD OF THE DISCLOSURE

The present disclosure generally relates to radio frequency (RF) systems and, more particularly, to antennas used in RF systems.

BACKGROUND

RF systems are systems that transmit and receive signals in the form of electromagnetic waves in the RF range of approximately 3 kilohertz (kHz) to 300 gigahertz (GHz). Radio systems are commonly used for wireless communications, with satellite communications or cellular/wireless mobile communications being prominent examples.

In context of RF systems, an antenna is a device that serves as the interface between radio waves propagating wirelessly through space and electric currents moving in metal conductors used with a transmitter or receiver. During transmission (Tx), an RF transmitter supplies an electric current to the antenna's terminals, and the antenna radiates the energy from the current as radio waves. During reception (Rx), an antenna of an RF receiver intercepts some of the power of a radio wave in order to produce an electric current at its terminals, which current is subsequently applied in the RF receiver. Antennas are essential components of all radio equipment, and are used in radio broadcasting, broadcast television, two-way radio, communications receivers, radar, cell phones, satellite communications and other devices.

An antenna with a single antenna element will typically broadcast a radiation pattern that radiates equally in all directions in a spherical wavefront. A dish reflector antenna can focus this energy in a particular direction, but must be physically or mechanically steered to adjust the beam focus direction. Phased arrays (also interchangeably referred to as "phased array antennas") generally refer to a collection of antenna elements that are used to focus electromagnetic energy in a particular direction, thereby creating a main beam. Phased arrays offer numerous advantages over single antenna systems, such as high gain, a flat or contoured panel design, the ability to perform near-instantaneous directional steering, and the option to form multiple beams and beam shapes. Therefore, phased arrays are being used more frequently in a myriad of different applications, such as satellite communications, military radars, automotive radars, and 5$^{th}$ generation (5G) cellular communication systems.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-2D provide illustrations of different examples of non-uniformly thinned half-duplex phased arrays with dual-band antenna elements, according to some embodiments of the present disclosure;

DESCRIPTION OF EXAMPLE EMBODIMENTS OF THE DISCLOSURE

Overview

Figure 1:
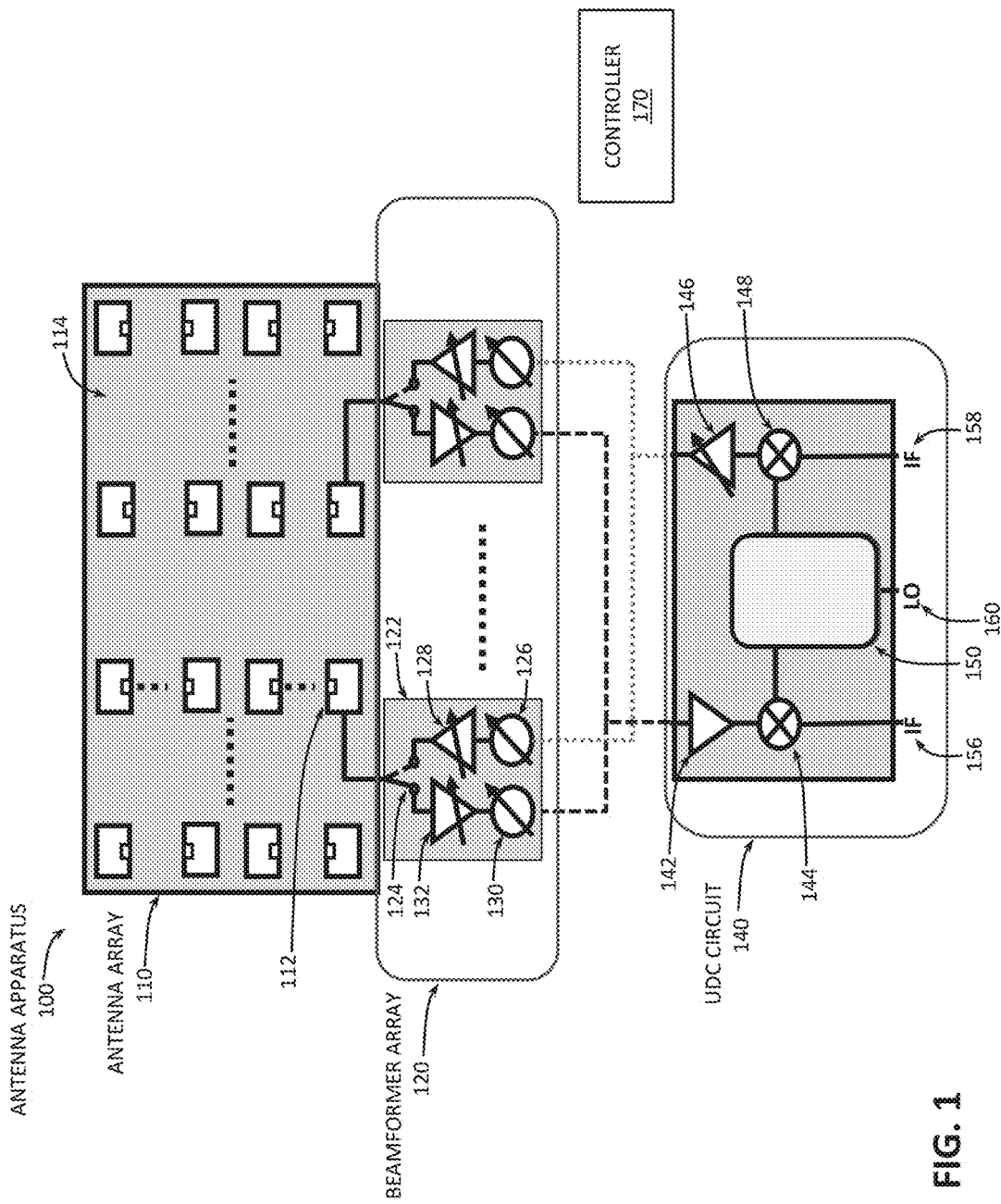
FIG. 1 provides a schematic illustration of a generic example antenna of a phased array apparatus in which a non-uniformly thinned half-duplex phased array with dual-band antenna elements may be implemented, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating non-uniformly thinned half-duplex phased arrays with dual-band antenna elements, proposed herein, it might be useful to first understand phenomena that may come into play in antennas. The following foundational information may be viewed as a basis from which the present disclosure may be properly explained. Such information is offered for purposes of explanation only and, accordingly, should not be construed in any way to limit the broad scope of the present disclosure and its potential applications.

As described above, phased arrays generally refer to a collection of antenna elements that are used to focus RF energy in a particular direction, thereby creating a main beam. In particular, the individual antenna elements of a phased array may radiate in an approximately cosine pattern perpendicular to the array plane, but, collectively, a plurality of such antenna elements may be configured to generate a wavefront in a particular direction through constructive and destructive interference. The relative phases of the signal transmitted at each antenna element can be either fixed or adjusted, allowing the antenna system to steer the wavefront in different directions. The radiated patterns of the antenna elements of a phased array are configured to constructively interfere in a target direction creating a wavefront in that direction called the "main beam" (also referred to as the "main lobe"). The phased array antennas can realize increased gain and improve signal to interference plus noise ratio in the direction of the main beam. The radiation pattern destructively interferes in several other directions other than the direction of the main beam and can reduce gain in those directions.

Some satellite communication systems use different frequency bands (dual-bands) for uplink (i.e., transmission of data from user terminals to satellites) and downlink (i.e., transmission of data from satellites to user terminals). For example, Ka-band satellite communications use frequencies near 30 GHz for the uplink to satellites, and frequencies near 20 GHz for the downlink to user terminals. Typically, this is done using dish style antennas for geostationary (GEO) satellites. However, for low-earth orbit (LEO) satellites, a dish may not practical. Therefore, to deliver the next generation of satellite applications, phased arrays are increasingly used, combining multiple individual antenna elements to improve overall performance, increase gain, cancel out interference, and quickly steer the array so that the array is most sensitive in a particular direction. In such applications, phased arrays may be used to track the satellites and quickly handoff to the next satellite in view.

Dual-band communications with phased arrays typically requires using two separate phased arrays since the spacing between antenna elements and the overall area occupied by antenna elements is frequency-dependent and, therefore, is different for different frequency bands. For example, for Ka-band satellite communications, spacing between individual antenna elements needs to be about $\lambda_{Rx}/2=7.5$ millimeter (mm) for the 20 GHz Rx band but only about $\lambda_{Tx}/2=5$ mm for the 30 GHz Tx band. Finding a compromise between these different demands is not trivial. On one hand, the Tx band cannot use the wider 7.5 mm element spacing without causing grating lobes that would not be permitted by the transmit mask stipulated in the communication licenses. On the other hand, using the narrower 5 mm spacing cannot be used for Rx without driving up the cost.

Embodiments of the present disclosure provide phased arrays that may be used for Tx and Rx communications in different frequency bands. The phased arrays presented herein are non-uniformly thinned half-duplex phased arrays with dual-band antenna elements. Such phased arrays are "half-duplex" in that they are configured for communication in one direction at a time, i.e., at a given time, they may either be used for Tx or for Rx. Such phased arrays are "with dual-band antenna elements" in that, in addition to using antenna elements configured for Tx or for Rx only, they implement some antenna elements that are configured for both Tx and Rx, where Tx and Rx communications are in different bands. The latter antenna elements are referred to herein as "dual Rx-Tx antenna elements." The phased arrays presented herein are "thinned" in that they are formed according to a method of optimizing array geometry known as "thinning," in which a large planar array of uniformly spaced antenna elements is used as a starting point and then different antenna elements are systematically removed (i.e., the array is thinned) to realize a thinned array that has performance comparable to that of a full array (i.e., to realize a thinned array without substantial degradation in performance compared to the full array) while reducing array complexity, fabrication costs, setup costs, weight, power consumption, etc. Finally, the phased arrays presented herein are thinned "non-uniformly" in that different antenna elements used for Tx may have different numbers of nearest and/or second-nearest neighbor antenna elements used for Rx for the example when the central frequency of the Rx band is lower than that of the Tx band, and vice versa for the example when the central frequency of the Tx band is lower than that of the Rx band. The "thinning" is done for the antenna elements of the lower frequency and longer wavelength so that fewer beamformer channels may be used. The non-uniform thinning of phased arrays as presented herein may be seen as pseudo-random thinning where different blocks of antenna elements of a phased array may have different arrangements of antenna elements used for Tx only and dual Rx-Tx antenna elements. The phased arrays disclosed herein are based on recognition that non-uniformly thinned half-duplex phased arrays with dual-band antenna elements may enable designs that are optimal in terms of both antenna performance and beamformer arrangements.

In some embodiments, the phased arrays disclosed herein may be particularly suitable for satellite communications, e.g., for satellite communications using 20 GHz Rx band and 30 GHz Tx band. In such embodiments, the phased arrays disclosed herein may use a randomized thinned Rx array design built on the 5 mm spacing of the Tx array such that the average Rx element spacing is still 7.5 mm and the resulting antenna pattern is nearly identical to the standard pattern with fixed 7.5 mm element spacing. Such embodiments make use of the 3/2 relationship in the frequency between Tx and Rx bands and, hence, 9/4 relationship in two dimensions. Therefore, such phased arrays may implement antenna arrays where only 4 out of every 9 Tx antenna elements are also used for Rx (i.e., out of every 9 antenna elements, 4 may be dual Rx-Tx antenna elements and 5 may be Tx only antenna elements).

While some descriptions of non-uniformly thinned half-duplex phased arrays with dual-band antenna elements are provided herein with reference to satellite communications, these descriptions are equally applicable, or may be easily adapted, to other types of RF communications such as mobile communications, e.g., to 5G communications (either in millimeter-wave (mm-wave) or sub-6 GHz applications of 5G). In addition, while some descriptions are provided herein with reference to specific frequency bands (e.g., 20 GHz Rx band and 30 GHz Tx band), these descriptions are equally applicable, or may be easily adapted, to frequency bands which are different from these bands. For example, descriptions provided herein may be generalized to any ratio M/N of a center frequency of a higher band (e.g., the center frequency of 30 GHz for the example of a 30 GHz Tx band described herein) to a center frequency of a lower band (e.g., the center frequency of 20 GHz for the example of a 20 GHz Rx band described herein), where each of M and N may be the smallest integer greater than zero that represents the ratio (e.g., for the example of 20 GHz Rx band and 30 GHz Tx band described herein, M=3 and N=2). Furthermore, while some descriptions are provided herein with reference to an example where the Tx band has a higher central frequency and, therefore, a smaller target spacing between the antenna elements (the spacing should be typically on the order of half of the wavelength and, therefore, is inversely proportional to frequency) than the Rx band, these descriptions are equally applicable, or may be easily adapted, to embodiments where the Rx band has a higher central frequency, except that the Tx only antenna elements described herein would be replaced with Rx only antenna elements and vice versa. For example, descriptions provided herein may be generalized to refer to wireless communication in a first direction (e.g., transmission of Tx signals) in a frequency band having a first center frequency (e.g., 30 GHz) and to refer to wireless communication in a second direction (e.g., receipt of Rx signals) in a frequency band having a second center frequency (e.g., 20 GHz). Still further, while some descriptions may be provided herein with reference to circularly polarized antenna elements (i.e., antenna elements having a plane of polarization that rotates in a corkscrew pattern making one complete revolution during each wavelength) because such antennas may be particularly advantageous (e.g., compared to linearly polarized antennas) in terms of reflectivity, absorption, multi-path, and phasing issues, these descriptions are equally applicable, or may be easily adapted, to antenna elements employing other types of polarization. Further, in some embodiments, when used for Rx, the antenna elements may have one polarization (e.g., right-hand circular polarization) while, when used for Tx, the antenna elements may have another polarization (e.g., left-hand circular polarization).

As will be appreciated by one skilled in the art, aspects of the present disclosure, in particular aspects of non-uniformly thinned half-duplex phased arrays with dual-band antenna elements as proposed herein, may be embodied in various manners, e.g., as a method, a system, a computer program product, or a computer-readable storage medium. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." At least some functions described in this disclosure (e.g., at least operation of the non-uniformly thinned half-duplex phased arrays with dual-band antenna elements as described herein) may be implemented as an algorithm executed by one or more hardware processing units, e.g., one or more microprocessors of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing beamformers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. For example, each of the components (e.g., each of the antenna elements) illustrated in the electric circuit diagrams of the present drawings may be implemented as a plurality of such components which, equivalently, act as the components described herein. In another example, various circuits described herein may include further components that are not specifically illustrated in the present drawings, such as resistors, transistors, capacitors, various electrical interconnects (i.e., electrically-conductive structures configured to provide electrical connectivity between various circuit components), etc.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect electrical connection through one or more passive or active intermediary devices/components. In another example, the terms "circuit" or "circuitry" (which may be used interchangeably) refer to one or more passive and/or active components that are arranged to cooperate with one another to provide a desired function. Sometimes, in the present descriptions, the term "circuit" may be omitted (e.g., a beamformer circuit may be referred to simply as a "beamformer," etc.). If used, the terms "substantially," "approximately," "about," etc., may be used to generally refer to being within +/−20% of a target value, e.g., within +/−10% of a target value, based on the context of a particular value as described herein or as known in the art.

Example Antenna Apparatus

FIG. 1 provides a schematic illustration of an antenna apparatus 100, e.g., a phased array system/apparatus, in which non-uniformly thinned half-duplex phased arrays with dual-band antenna elements may be implemented, according to some embodiments of the present disclosure. As shown in FIG. 1, the system 100 may include an antenna array 110, a beamformer array 120, an Up/Down Frequency Converter (UDC) circuit 140, and a controller 170.

In general, the antenna array 110 may include a plurality of antenna elements 112 (only one of which is labeled with a reference numeral in FIG. 1 in order to not clutter the drawing), housed in or over a substrate 114, where the substrate 114 may be, e.g., a printed circuit board (PCB) or any other support structure. In various embodiments, the antenna elements 112 may be radiating elements or passive elements. For example, the antenna elements 112 may include dipoles, open-ended waveguides, slotted waveguides, microstrip antennas, and the like. In some embodiments, the antenna elements 112 may include any suitable elements configured to wirelessly transmit and/or receive RF signals. The antenna array 110 may be a phased array and, therefore, will be referred to as such in the following.

In some embodiments, the phased array 110 may be a planar phased array, e.g., a printed phased array. In particular, the phased array 110 may be a non-uniformly thinned half-duplex phased array with dual-band antenna elements. To that end, at least some of the antenna elements 112 may be dual-band antenna elements, while at least some other ones of the antenna elements 112 may be either Tx or Rx antenna elements. As used herein, referring to an antenna element 112 as a "Tx antenna element" means that the antenna element is configured to transmit RF signals in one of the Tx frequency bands, e.g., in the 30 GHz (e.g., in the 27.5-31 GHz uplink) band of Ka-bands for satellite communications. Such an antenna element may, but does not have to, also be able to receive RF signals in one of the Rx frequency bands, the Rx band being different from the Tx band. Similarly, referring to an antenna element 112 as a "Rx antenna element" means that the antenna element is configured to receive RF signals in one of the Rx frequency bands, e.g., in the 20 GHz (e.g., in the 17.7-21.2 GHz downlink) band of Ka-bands for satellite communications. Such an antenna element may, but does not have to, also be able to transmit RF signals in one of the Tx frequency bands, the Tx band being different from the Rx band. On the other hand, referring to an antenna element 112 as a "dual-band antenna element" means that the antenna element is configured to, both, transmit RF signals in one of the Tx frequency bands, e.g., in the 30 GHz, and receive RF signals in one of the Rx frequency bands, e.g., in the 20 GHz.

Further details shown in FIG. 1, such as the particular arrangement of the beamformer array 120, of the UDC circuit 140, and the relation between the beamformer array 120 and the UDC circuit 140 may be different in different embodiments, with the description of FIG. 1 providing only some examples of how these components may be used together with the phased array 110 being configured as a non-uniformly thinned half-duplex phased array with dual-band antenna elements. Furthermore, although some embodiments shown in the present drawings illustrate a certain number of components (e.g., a certain number of antenna elements 112, beamformers 122, and/or UDC circuits 140), it is appreciated that these embodiments may be implemented with any number of these components in accordance with the descriptions provided herein. Furthermore, although the disclosure may discuss certain embodiments with reference to certain types of components of an antenna apparatus (e.g., beamformers with a certain number of channels), it is understood that the embodiments disclosed herein may be implemented with different types of components.

The beamformer array 120 may include a plurality of beamformers 122 (only one of which is labeled with a reference numeral in FIG. 1 in order to not clutter the drawing). The beamformers 122 may be seen as transceivers (e.g., devices which may transmit and/or receive signals, e.g., RF signals) that feed to antenna elements 112. In some embodiments, a single beamformer 122 may be associated with (i.e., exchange signals with, e.g., feed signals to and/or receive signals from) a plurality of antenna elements 112, e.g., as is illustrated with an example shown in FIG. 3. In other embodiments, a single beamformer 122 may be associated with one of the antenna elements 112 (e.g., in a one-to-one correspondence). In still other embodiments, multiple beamformers 122 may be associated with a single antenna element 112.

In some embodiments, each of the beamformers 122 may include a switch 124 to switch the path from a corresponding antenna element 112 to the receiver or the transmitter path. In other embodiments, the switch 124 may be omitted, e.g., for the antenna elements 112 that are either Tx-only or Rx-only, when a given antenna element 112 has separate feed points for Tx and Rx signals. Although not specifically shown in FIG. 1, in some embodiments, each of the beamformers 122 may also include another switch to switch the path from a signal processor (also not shown) to the receiver or the transmitter path. As shown in FIG. 1, in some embodiments, the Tx path of the beamformer 122 may include a phase shifter 126 and a variable (e.g., programmable) gain amplifier 128, while the receive path (Rx path) may include a phase shifter 130 and a variable (e.g., programmable) gain amplifier 132. The phase shifter 126 may be configured to adjust the phase of the RF signal to be transmitted (Tx signal) by the antenna element 112 and the variable gain amplifier 128 may be configured to adjust the amplitude of the Tx signal. Similarly, the phase shifter 130 and the variable gain amplifier 132 may be configured to adjust the RF signal received (Rx signal) by the antenna element 112 before providing the Rx signal to further circuitry, e.g., to the UDC circuit 140, to the signal processor (not shown), etc. The beamformers 122 may be considered to be "in the RF path" of the antenna apparatus 100 because the signals traversing the beamformers 122 are RF signals (i.e., Tx signals which may traverse the beamformers 122 are RF signals upconverted by the UDC circuit 140 from lower frequency signals, e.g., from intermediate frequency (IF) signals or from baseband signals, while Rx signals which may traverse the beamformers 122 are RF signals which have not yet been downconverted by the UDC circuit 140 to lower frequency signals, e.g., to IF signals or to baseband signals).

Although a switch is shown in FIG. 1 to switch from the transmitter path to the receive path (i.e., the switch 124), in other embodiments of the beamformer 122, other components can be used, such as a duplexer. Furthermore, although FIG. 1 illustrates an embodiment where the beamformers 122 include the phase shifters 126, 130 (which may also be referred to as "phase adjusters") and the variable gain amplifiers 128, 132, in other embodiments, any of the beamformers 122 may include other components to adjust the magnitude and/or the phase of the Tx and/or Rx signals. In some embodiments, one or more of the beamformers 122 may not include the phase shifter 126 and/or the phase shifter 130 because the desired phase adjustment may, alternatively, be performed using a phase shift module in the local oscillator (LO) path. In other embodiments, phase adjustment performed in the LO path may be combined with phase adjustment performed in the RF path using the phase shifters of the beamformers 122. In some embodiments, the beamformers 122 may be configured to process signals in an analog domain. However, in alternative embodiments, at least a portion of beamforming may be performed in a digital domain.

Turning to the details of the UDC, in general, the UDC circuit 140 may include an upconverter and/or downconverter circuitry, i.e., in various embodiments, the UDC circuit 140 may include 1) an upconverter circuit but no downconverter circuit, 2) a downconverter circuit but no upconverter circuit, or 3) both an upconverter circuit and a downconverter circuit. As shown in FIG. 1, in some embodiments, the downconverter circuit of the UDC circuit 140 may include an amplifier 142 and a mixer 144, while the upconverter circuit of the UDC circuit 140 may include an amplifier 146 and a mixer 148. In some embodiments, the UDC circuit 140 may further include a phase shift module 150.

In various embodiments, the term "UDC circuit" may be used to include frequency conversion circuitry (e.g., a frequency mixer configured to perform upconversion to RF signals for wireless transmission, a frequency mixer configured to perform downconversion of received RF signals, or both), as well as any other components that may be included in a broader meaning of this term, such as filters, analog-to-digital converters (ADCs), digital-to-analog converters (DACs), transformers, and other circuit elements typically used in association with frequency mixers. In all of these variations, the term "UDC circuit" covers implementations where the UDC circuit 140 only includes circuit elements related to the Tx path (e.g., only an upconversion mixer but not a downconversion mixer; in such implementations the UDC circuit may be used as/in an RF transmitter for generating RF signals for transmission), implementations where the UDC circuit 140 only includes circuit elements related to the Rx path (e.g., only an downconversion mixer but not an upconversion mixer; in such implementations the UDC circuit 140 may be used as/in an RF receiver to downconvert received RF signals, e.g., the UDC circuit 140 may enable an antenna element of the phased array 110 to act, or be used, as a receiver), as well as implementations where the UDC circuit 140 includes, both, circuit elements of the Tx path and circuit elements of the Rx path (e.g., both the upconversion mixer and the downconversion mixer; in such implementations the UDC circuit 140 may be used as/in an RF transceiver, e.g., the UDC circuit 140 may enable an antenna element of the phased array 110 to act, or be used, as a transceiver).

Although a single UDC circuit 140 is illustrated in FIG. 1, multiple UDC circuits 140 may be included in the antenna apparatus 100 to provide upconverted RF signals to and/or receive RF signals to be downconverted from any one of the beamformers 122. Each UDC circuit 140 may be associated with a plurality of beamformers 122 of the beamformer array 120, e.g., using a splitter/combiner. This is schematically illustrated in FIG. 1 by showing dashed lines and dotted lines between the UDC circuit 140 and the beamformer array 120, the dashed and dotted lines connecting various elements of the beamformer array 120 and the UDC circuit 140. Namely, FIG. 1 illustrates that the dashed lines connect the downconverter circuit of the UDC circuit 140 (namely, the amplifier 142) to the Rx paths of two different beamformers 122, and that the dotted lines connect the upconverter circuit of the UDC circuit 140 (namely, the amplifier 146) to the Tx paths of two different beamformers 122. In some embodiments, an individual UDC circuit 140 may be associated with one of the antenna elements 112 (e.g., there could be a 1:1 correspondence between the UDC circuits 140 and the antenna elements 112). Such embodiments may be advantageous in that they may allow performing phase shifting at the IF, at baseband, or in the digital domain.

In some embodiments, the mixer 144 in the downconverter path (i.e., Rx path) of the UDC circuit 140 may have [at least] two inputs and one output. One of the inputs of the mixer 144 may include an input from the amplifier 142, which may, e.g., be a low-noise amplifier (LNA). The second input of the mixer 144 may include an input indicative of the LO signal 160. In some embodiments, phase shifting may be implemented in the LO path (additionally or alternatively to the phase shifting in the RF path), in which case the LO signal 160 may be provided, first, to a phase shift module 150, and then a phase-shifted LO signal 160 is provided as the second input to the mixer 144. In the embodiments where phase shifting in the LO path is not implemented, the phase shift module 150 may be absent and the second input of the mixer 144 may be configured to receive the LO signal 160. The one output of the mixer 144 is an output to provide the downconverted signal 156, which may, e.g., be an IF signal 156. The mixer 144 may be configured to receive an RF Rx signal from the Rx path of one of the beamformers 122, after it has been amplified by the amplifier 142, at its first input and receive either a signal from the phase shift module 150 or the LO signal 160 itself at its second input and mix these two signals to downconvert the RF Rx signal to a lower frequency, producing the downconverted Rx signal 156, e.g., the Rx signal at the IF. Thus, the mixer 144 in the downconverter path of the UDC circuit 140 may be referred to as a "downconverting mixer."

In some embodiments, the mixer 148 in the upconverter path (i.e., Tx path) of the UDC circuit 140 may have [at least] two inputs and one output. The first input of the mixer 148 may be an input for receiving a Tx signal 158 of a lower frequency, e.g., the Tx signal at IF. The second input of the mixer 148 may include an input indicative of the LO signal 160. In the embodiments where phase shifting is implemented in the LO path (either additionally or alternatively to the phase shifting in the RF path), the LO signal 160 may be provided, first, to a phase shift module 150, and then a phase-shifted LO signal 160 is provided as the second input to the mixer 148. In the embodiments where phase shifting in the LO path is not implemented, the phase shift module 150 may be absent and the second input of the mixer 148 may be configured to receive the LO signal 160. The one output of the mixer 148 is an output to the amplifier 146, which may, e.g., be a power amplifier (PA). The mixer 148 may be configured to receive an IF Tx signal 158 (i.e., the lower frequency, e.g., IF, signal to be transmitted) at its first input and receive either a signal from the phase shift module 150 or the LO signal 160 itself at its second input and mix these two signals to upconvert the IF Tx signal to the desired RF frequency, producing the upconverted RF Tx signal to be provided, after it has been amplified by the amplifier 146, to the Tx path of one of the beamformers 122. Thus, the mixer 148 in the upconverter path of the UDC circuit 140 may be referred to as a "upconverting mixer."

In some embodiments, the amplifier 128 may be a PA and/or the amplifier 132 may be an LNA.

As is known in communications and electronic engineering, an IF is a frequency to which a carrier wave is shifted as an intermediate step in transmission or reception. The IF signal may be created by mixing the carrier signal with an LO signal in a process called heterodyning, resulting in a signal at the difference or beat frequency. Conversion to IF may be useful for several reasons. One reason is that, when several stages of filters are used, they can all be set to a fixed frequency, which makes them easier to build and to tune. Another reason is that lower frequency transistors generally have higher gains so fewer stages may be required. Yet another reason is to improve frequency selectivity because it may be easier to make sharply selective filters at lower fixed frequencies. It should also be noted that, while some descriptions provided herein refer to signals 156 and 158 as IF signals, these descriptions are equally applicable to embodiments where signals 156 and 158 are baseband signals. In such embodiments, frequency mixing of the mixers 144 and 148 may be a zero-IF mixing (also referred to as a "zero-IF conversion") in which the LO signal 160 used to perform the mixing may have a center frequency in the band of RF Rx/Tx frequencies.

Although not specifically shown in FIG. 1, in further embodiments, the UDC circuit 140 may further include a balancer, e.g., in each of the Tx and Rx paths, configured to mitigate imbalances in the in-phase and quadrature (IQ) signals due to mismatching. Furthermore, although also not specifically shown in FIG. 1, in other embodiments, the antenna apparatus 100 may include further instances of a combination of the phased array 110, the beamformer array 120, and the UDC circuit 140 as described herein.

The controller 170 may include any suitable device, configured to control operation of various parts of the antenna apparatus 100. For example, in some embodiments, the controller 170 may control the amount and the timing of phase shifting implemented in the antenna apparatus 100. In another example, in some embodiments, the controller 170 may control various signals, as well as the timing of those signals, provided to various antenna elements 112 when the antenna array 110 is implemented as a non-uniformly thinned half-duplex phased array with dual-band antenna elements.

The antenna apparatus 100 can steer an electromagnetic radiation pattern of the phased array 110 in a particular direction, thereby enabling the phased array 110 to generate a main beam in that direction and side lobes in other directions. The main beam of the radiation pattern is generated based on constructive inference of the transmitted RF signals based on the transmitted signals' phases. The side lobe levels may be determined by the amplitudes of the RF signals transmitted by the antenna elements. The antenna apparatus 100 can generate desired antenna patterns by providing phase shifter settings for the antenna elements 112, e.g., using the phase shifters of the beamformers 122 and/or the phase shift module 150.

Non-Uniform Thinning of Half-Duplex Phased Arrays with Dual-Band Antenna Elements FIGS. 2A-2D provide of different examples of non-uniformly thinned half-duplex phased arrays with dual-band antenna elements, according to some embodiments of the present disclosure. FIGS. 2A-2D illustrate embodiments for example implementations where the Rx band has a central frequency of around 20 GHz and the Tx band has a central frequency of around 30 GHz.

Figure 2A:
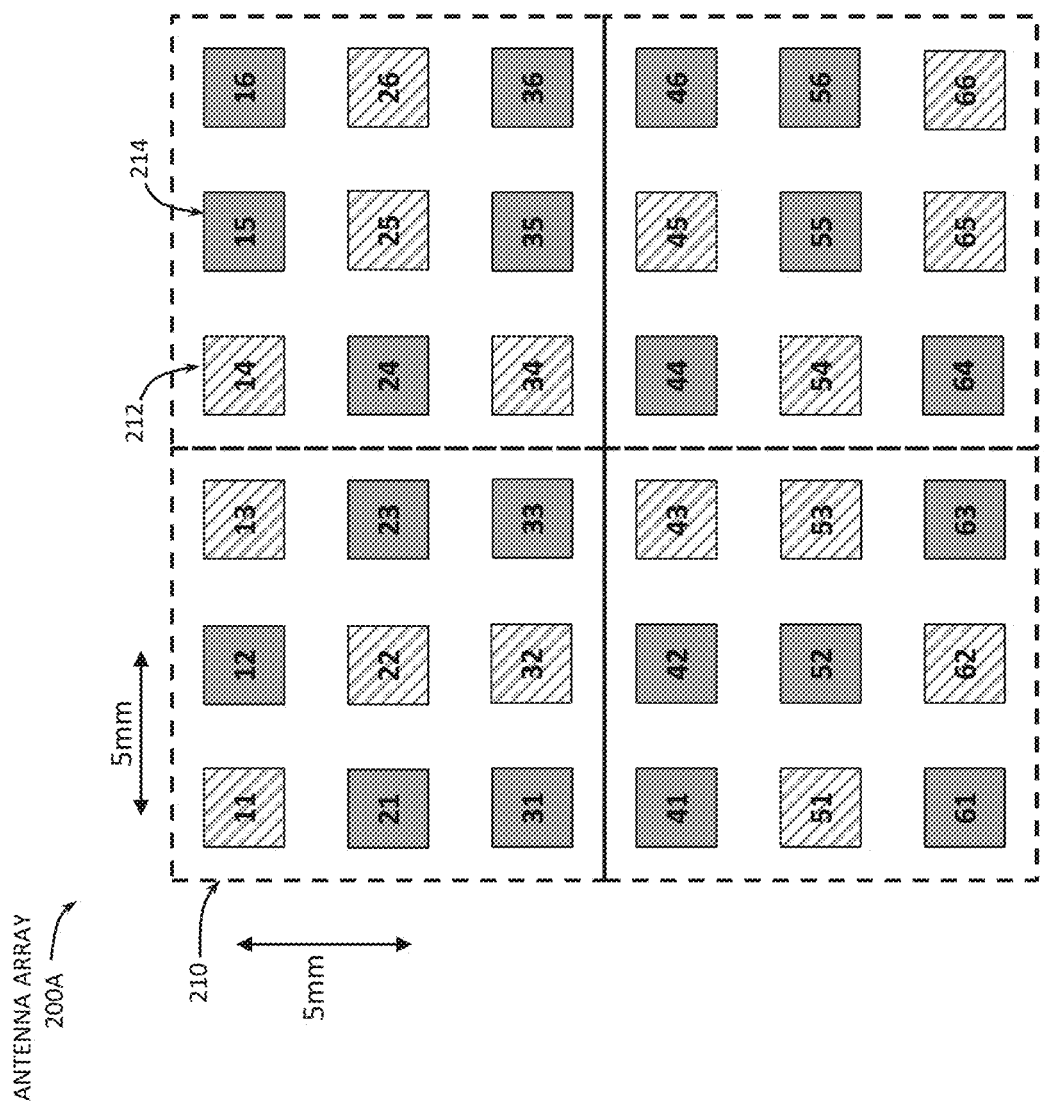

FIG. 2A illustrates a phased array 200A, which may be a first example of a non-uniformly thinned half-duplex phased array with dual-band antenna elements, according to some embodiments of the present disclosure. As shown in FIG. 2A, the phased array 200A may include a plurality of antenna blocks 210, only one of which is labeled in FIG. 2A with a reference numeral, with other analogous blocks being indicated with dashed contours. Each antenna block 210 may include a plurality of antenna elements 212 (only one of which is labeled in FIG. 2A with a reference numeral, with other analogous antenna elements also being shown with the same pattern of slanted lines as the labeled element 212) and a plurality of antenna elements 214 (only one of which is labeled in FIG. 2A with a reference numeral, with other analogous antenna elements also being colored with a solid color as the labeled element 214). Each of the antenna elements 212 and 214 may be an example of the antenna elements 112, described above, where the antenna elements 212 represent dual-band antenna elements, while the antenna elements 214 represent Tx antenna elements for the example where the central frequency of the Rx band is lower than that of the Tx band, as is the case for the 20 GHz Rx band and the 30 GHz Tx band of Ka-band satellite communications. In some embodiments, antenna elements used for Rx may have a different polarization from the antenna elements used for Tx. For example, the Tx antenna elements 214 and the dual-band antenna elements 212 used for Tx may be right-hand circularly polarized, while the dual-band antenna elements 212 used for Rx may be left-hand circularly polarized, or vice versa. In other embodiments, polarizations of the antenna elements used for Rx and Tx may be the same. For the general scenario of the ratio M/N and the first and second directions of wireless communications as described above, each of the antenna elements 214 may be an antenna element configured to support the wireless communication in the first direction (e.g., Tx, when the center frequency of the Tx band is greater than the center frequency of the Rx band) without supporting the wireless communication in the second direction (e.g., Rx, when the center frequency of the Tx band is greater than the center frequency of the Rx band), while each of the antenna elements 212 may be an antenna element configured to support both the wireless communication in the first direction (e.g., Tx, when the center frequency of the Tx band is greater than the center frequency of the Rx band) and the wireless communication in the second direction (e.g., Rx, when the center frequency of the Tx band is greater than the center frequency of the Rx band). In some embodiments of such a general scenario, each of the antenna elements 214 may be a single-band antenna element to support the wireless communication in the first direction only (e.g., Tx, when the center frequency of the Tx band is greater than the center frequency of the Rx band) and/or each of the antenna elements 212 may be a dual-band antenna element to support both the wireless communication in the first direction (e.g., Tx, when the center frequency of the Tx band is greater than the center frequency of the Rx band) and the wireless communication in the second direction (e.g., Rx, when the center frequency of the Tx band is greater than the center frequency of the Rx band).

As described above, for the 20 GHz Rx band spacing between individual antenna elements needs to be about half the wavelength or 7.5 mm to prevent grating lobes over a wide scan range, while for the 30 GHz Tx band spacing between individual antenna elements needs to be about half the wavelength of this higher frequency or 5 mm to prevent these grating lobes. In the phased array 200A, the combination of the antenna elements 212 and 214 may be arranged uniformly in rows and columns, so that spacing between adjacent antenna elements 212 and/or 214 of a given row is about 5 mm and spacing between adjacent antenna elements 212 and/or 214 of a given column is about 5 mm. FIG. 2A illustrates an example of 6 rows and 6 columns, where a 2-digit number shown within each antenna element indicates the row and the column of this antenna element). In this way, because each of the antenna elements 212 and 214 is capable of transmitting signals in the Tx band of 30 GHz, an arrangement of all of the antenna elements 212 and 214 provides a Tx array with spacing between individual antenna elements being on the order of about half of the wavelength of the Tx band, i.e., with spacing of about 5 mm. On the other hand, only the dual-band antenna elements 212 may be configured for receiving signals in the Rx band of 20 GHz. Because the relation of the central frequency of the Rx band to the central frequency of the Tx band is $$2/3 \left( \frac{20 \text{ GHz}}{30 \text{ Ghz}} = \frac{2}{3} \right),$$

i.e., N=2 and M=3, extended to a planar array this corresponds to a relation of 4/9 (i.e., more generally, extended to a planar array this corresponds to a relation of $N^2/M^2$), which means that every block 210 may include 9 antenna elements in total (i.e., a sum of the antenna elements 212 and 214 of each block 210 is 9 or, more generally, $M^2$), out of which only 4 (or, more generally, $N^2$) are dual-band antenna elements 212, and the rest 5 (or, more generally, $M^2-N^2$) are the single-band antenna elements 214. In this way, an average spacing between dual-band antenna elements 212 is $$7.5 \text{ mm } \left(5 \text{ mm} * \frac{3}{2} = 7.5 \text{ mm}\right),$$

which means that an arrangement of the dual-band antenna elements 212 provides a portion of a Rx array with spacing between individual antenna elements being on the order of about half of the wavelength of the Rx band, i.e., with spacing of about 7.5 mm.

Selection of 4 dual-band antenna elements 212 (to be used for Rx in addition to Tx) out of every set of 9 antenna elements of a given block 210 may be performed by thinning a planar array of uniformly spaced antenna elements. For example, consider that at first all of the antenna elements shown in FIG. 2A represent a large planar array of uniformly spaced antenna elements, and then only 4 antenna elements out of each separate block 210 of 9 antenna elements are designated as dual-band antenna elements 212 to be used for both Rx and Tx, while the remaining 5 antenna elements of each block 210 are designated as the Tx antenna elements 212, to be used for Tx only.

In some embodiments, selection of 4 dual-band antenna elements 212 out of every set of 9 antenna elements of different blocks 210 may be pseudo-random, resulting in a non-uniform distribution of the dual-band antenna elements 212 in the phased array 200A. In other words, as long as each block 210 includes 4 dual-band antenna elements 212 out of 9 antenna elements in total, which ones of the antenna elements are the dual-band antenna elements 212 may be different for at least some of the blocks 210. As a result of this, when considering all of the antenna elements of the phased array 200A that are not at the edge/periphery of the array 200A (i.e., those not in the first or last row and not in the first or last column of the array 200A), different antenna elements used for Tx may have different numbers of nearest and/or second-nearest neighbor antenna elements used for Rx for the example when the central frequency of the Rx band is lower than that of the Tx band. For example, consider the antenna element 23, which is one example of the Tx antenna element 214. The nearest neighbors for the antenna element 23 are antenna elements 22, 24, 13, and 33, out of which 2 are the dual-band antenna elements 212 that may be used for Rx (namely, antenna elements 13 and 22). The second-nearest neighbors for the antenna element 23 are antenna elements 12, 14, 32, and 34, out of which 3 are the dual-band antenna elements 212 that may be used for Rx (namely, antenna elements 14, 32, and 34). This means that, for the antenna element 23, a total of nearest and second-nearest neighbor antenna elements used for Rx is 5. In another example, consider the antenna element 24, which is another example of the Tx antenna element 212. The nearest neighbors for the antenna element 24 are antenna elements 23, 25, 14, and 34, out of which 3 are the dual-band antenna elements 212 that may be used for Rx (namely, antenna elements 14, 25, and 34), which is different from the antenna element 23 with its 2 nearest neighbors that may be used for Rx. The second-nearest neighbors for the antenna element 23 are antenna elements 13, 15, 33, and 35, out of which only 1 is the dual-band antenna elements 212 that may be used for Rx (namely, antenna element 13), which is different from the antenna element 23 with its 3 nearest neighbors that may be used for Rx. This means that, for the antenna element 24, a total of nearest and second-nearest neighbor antenna elements used for Rx is 4, which is also different from the antenna element 23 with its 5 nearest and second-nearest neighbor antenna elements that may be used for Rx. Thus, more generally, an arrangement of the antenna elements 212 and 214 may be such that a sum of a number of nearest neighbor antenna elements that are the antenna elements 212 and a number of second-nearest neighbor antenna elements that are the antenna elements 212 for one of the antenna elements 214 that is within the periphery of the antenna array is different from the sum for another one of the antenna elements 214 that is also within the periphery of the antenna array, FIG. 2B illustrates a phased array 200B and FIG. 2C illustrates a phased array 200C, which may be a second and a third examples of a non-uniformly thinned half-duplex phased array with dual-band antenna elements, according to some embodiments of the present disclosure. As shown in FIGS. 2B and 2C, similar to the phased array 200A, each of the phased arrays 200B and 200C may include a plurality of antenna blocks 210, only one of which is labeled in FIGS. 2B and 2C with a reference numeral, with other analogous blocks being similar blocks with 9 antenna elements each. The phased arrays 200B and 200C may include the dual-band antenna elements 212 and the Tx antenna elements 214 as described above except that in FIGS. 2B and 2C each of the dual-band antenna elements 212 is represented with a numeral "1" in place of the antenna element in the array and each of the Tx antenna elements 214 is represented with a box without any numeral (i.e., an empty box). Each of FIGS. 2B and 2C further illustrates a row 230 and a column 240, each populated the numbers. The numbers in the row 230 represent the total number of the dual-band antenna elements 212 in different columns, while the numbers in the column 240 represent the total number of the dual-band antenna elements 212 in different row. FIG. 2B illustrates that, in some embodiments, the dual-band antenna elements 212 may be equally represented in each column and row of the phased array 200B, e.g., each column and each row includes a total of 4 dual-band antenna elements 212 for the example shown in FIG. 2B. However, in other embodiments, the numbers of the dual-band antenna elements 212 may be different in different columns and/or rows (e.g., the dual-band antenna elements 212 may be arranged in a tapered manner where less of them are included in columns/rows closer to the edges/periphery of the antenna array than in columns/rows that are closer to the center of the array), as long as the total number of the dual-band antenna elements 212 in the phased array 200A is 4/9th of the total number of all antenna elements in the phased array 200A (or, equivalently, 4/5th of the number of antenna elements that may be used for Tx). One such embodiment of a tapered phased array is shown in FIG. 2C. FIG. 2A also illustrates a phased array that may be considered to be tapered although not all of the tapering of the arrangement of FIG. 2A is done at the edges/periphery of the antenna array. In particular, FIG. 2A illustrates such tapering at the edges/periphery of the antenna array for the columns, where only two of the dual-band antenna elements 212 are shown in the first and last columns of the antenna array 200A and each of the other columns have three of the dual-band antenna elements 212. On the other hand, the rows of the antenna array 200A are such that the third and the fourth rows have only two of the dual-band antenna elements 212 and each of the other rows have three of the dual-band antenna elements 212. However, by moving the bottom two of the blocks 210 shown in FIG. 2A to be at the top, a tapered phased array with tapering done at the edges/periphery of the antenna array would be obtained.

Figure 2D:
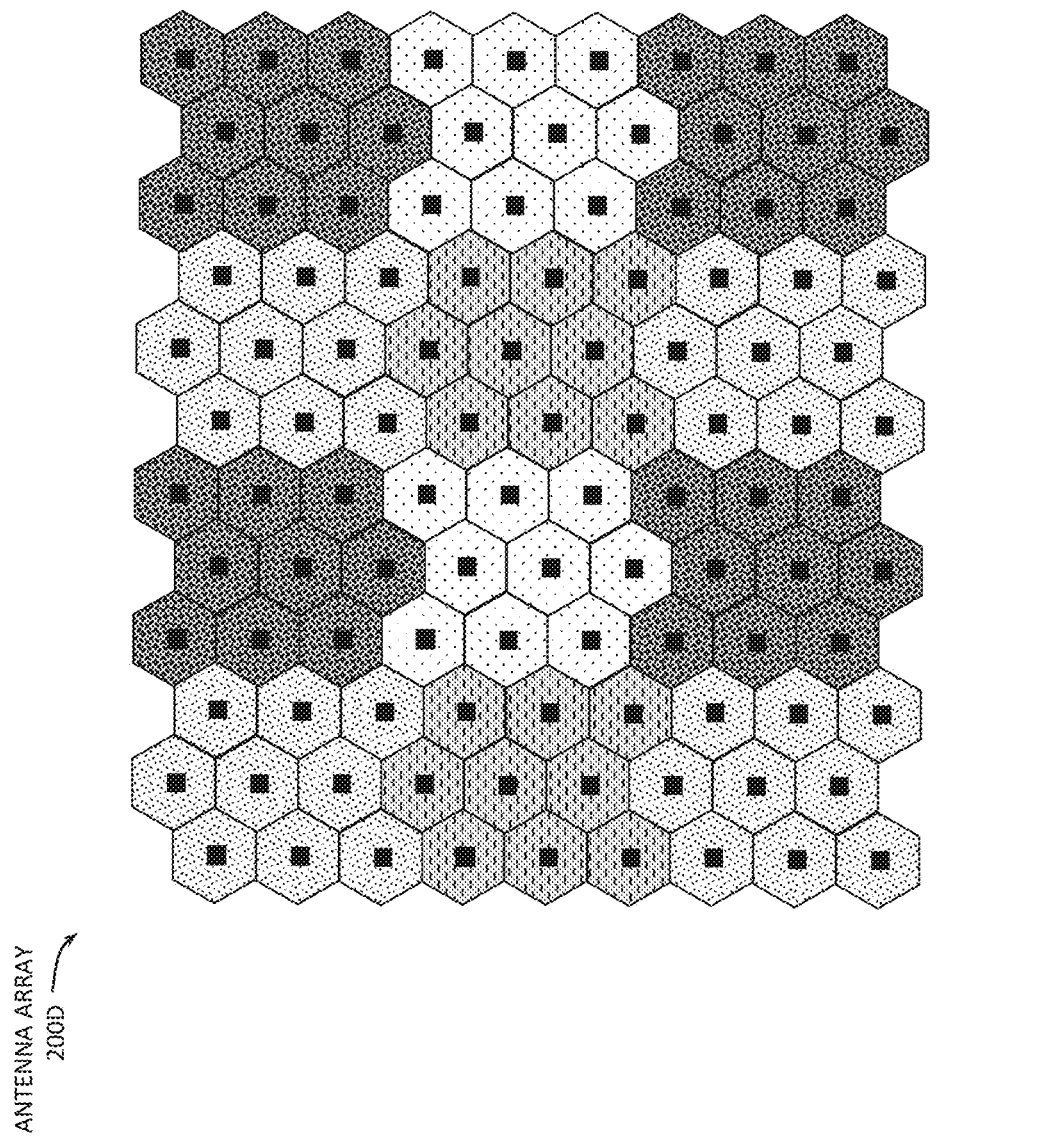

In other embodiments, antenna elements 212 and 214 may be arranged in manners that are different from the square arrangement of the phased arrays 200A-200C where each non-edge antenna element includes 4 nearest neighbor elements. For example, FIG. 2D illustrates a phased array 200D, which may be a fourth example of a non-uniformly thinned half-duplex phased array with dual-band antenna elements, according to some embodiments of the present disclosure. As shown in FIG. 2D, the phased array 200D may also include a plurality of antenna blocks of 9 antenna elements, similar to the blocks 210 of FIGS. 2A-2C, where different blocks are illustrated in FIG. 2D with different patterns (a total of 12 such blocks are shown in the example of FIG. 2D). The antenna elements of the phased array 200D are arranged in a hexagonal pattern, where each non-edge antenna element includes 6 nearest neighbor elements. The spacing between nearest neighbors of such an array may be substantially equal to $\lambda_{Tx}/\text{sqrt}(3)=0.577\lambda_{Tx}$, where $\lambda_{Tx}$ is the central wavelength of the Tx band. Although not specifically shown in FIG. 2D, every 4 antenna elements out of each block of 9 antenna elements of the phased array 200D may be dual-band antenna elements 212 that may be used for Rx (as well as for Tx), while the other 5 antenna elements may be Tx antenna elements 214. Other discussions provided with respect to the phased arrays 200A-200C are applicable to the phased array 200D and, therefore, in the interests of brevity, are not repeated.

Figure 3A:
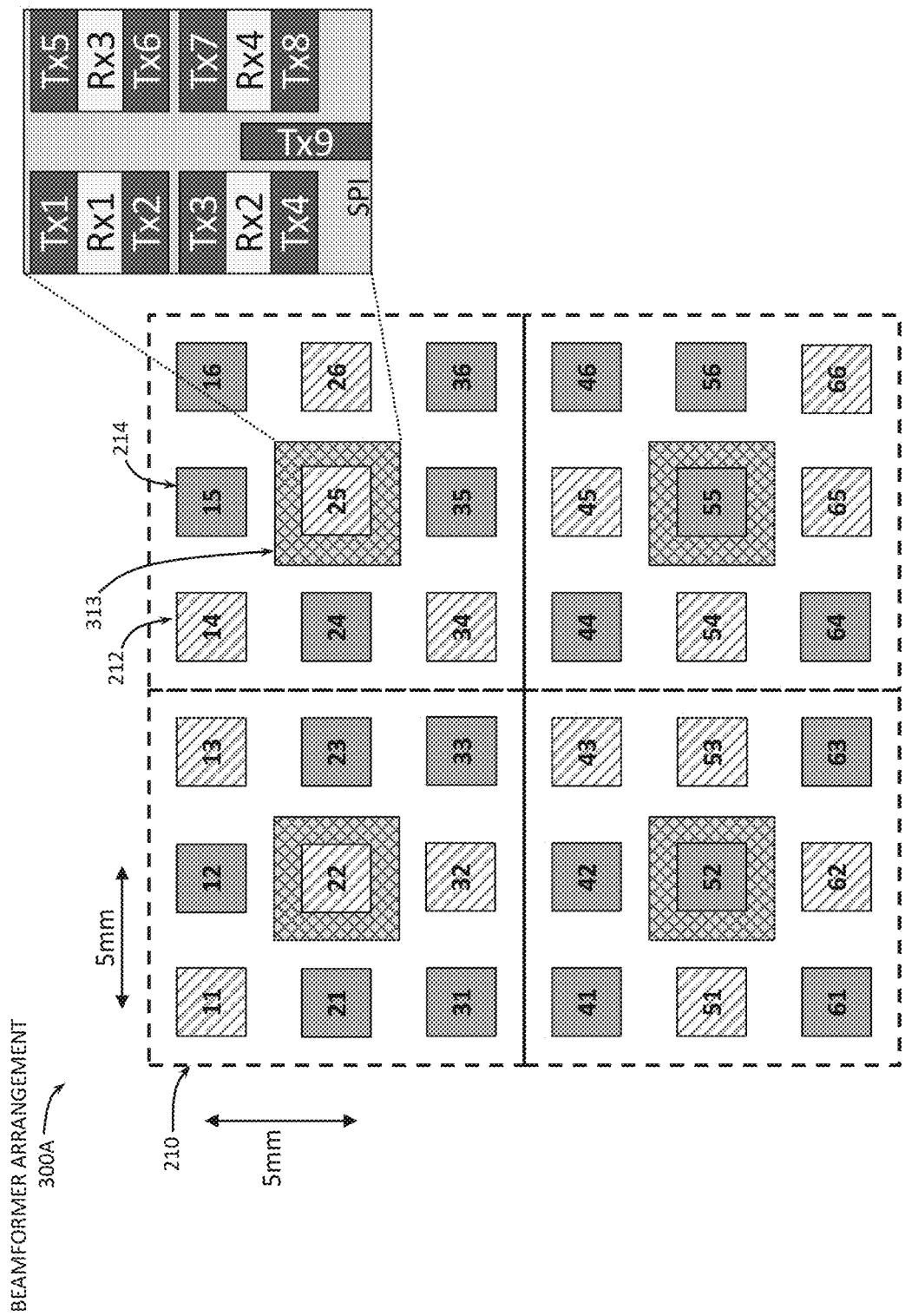
FIGS. 3A-3C provide illustrations of different beamformer arrangements that may be used with different non-uniformly thinned half-duplex phased arrays with dual-band antenna elements, according to some embodiments of the present disclosure.
Figure 3B:
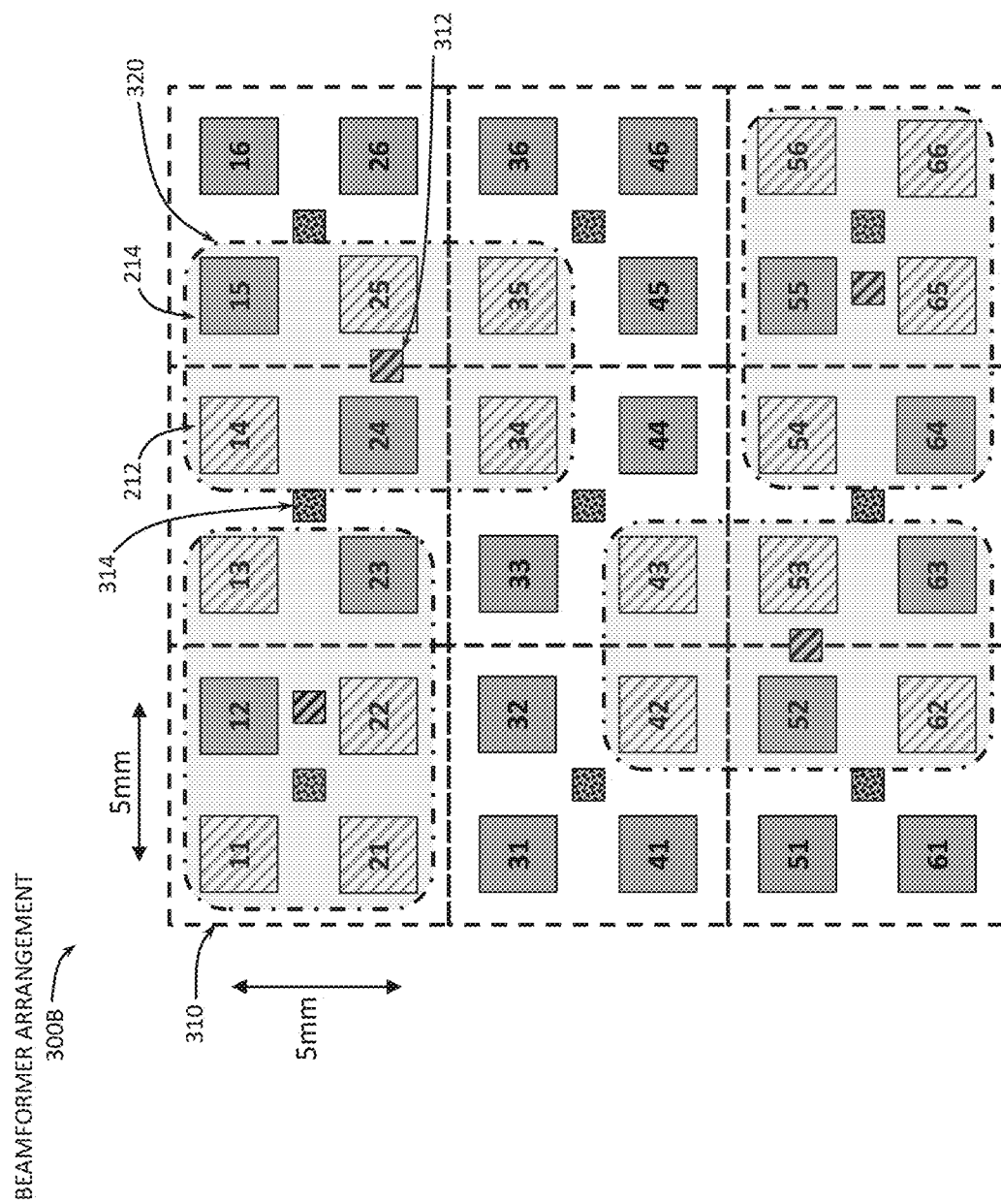
Figure 3C:
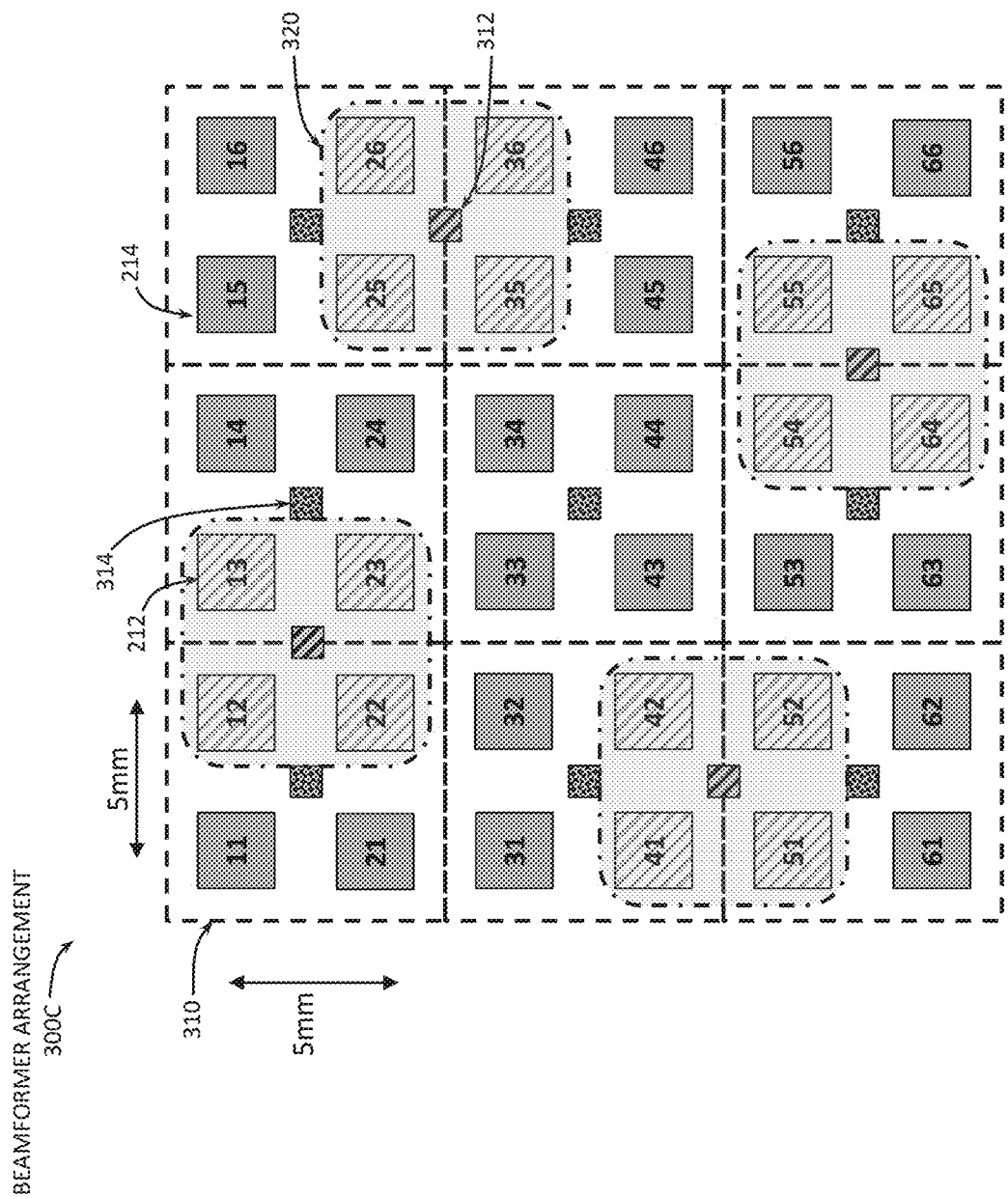

FIGS. 3A-3C provide illustrations of different beamformer arrangements 300 that may be used with different non-uniformly thinned half-duplex phased arrays with dual-band antenna elements, according to some embodiments of the present disclosure. In the following, beamformer arrangements are described for the examples of one channel for either Rx or Tx of signals to a single antenna element 112. However, these descriptions may be easily extended to embodiments where multiple channels may be used for either Rx or Tx of signals to a single antenna element 112; e.g., for circular polarization, oftentimes two channels per antenna element 112 are used for Tx and two channels per antenna element 112 are used for Rx.

FIG. 3A illustrates a beamformer arrangement 300A where an antenna array may be the antenna array 200A of FIG. 2A, and where a different beamformer 313 may be used for each of the blocks 210. In FIG. 3A, only one of the beamformers 313 is labeled with a reference numeral, but four such beamformers are shown, with identical beamformers 313 shown with the same patterns as the one labeled. Thus, FIG. 3A illustrates an embodiment where there is a 1:1 correspondence between the beamformers 313 and the blocks 210, where each of the beamformers 313 corresponds to one and only one of the blocks 210 and vice versa. Each of the beamformers 313 may include a total of 9 Tx channels and 4 Rx channels, as shown in FIG. 3A. More generally, each of the beamformers 313 may include a total of $M^2+N^2$ channels, where $M^2$ channels are for the wireless communication in the first direction and $N^2$ channels are for the wireless communication in the second direction, for the example where the center frequency of the band of the wireless communication in the first direction is greater than the center frequency of the band of the wireless communication in the second direction. Each of the Tx channels of the beamformer 313 may include components of the Tx path of the beamformer 122, described above, e.g., the phase shifter 126 and the amplifier (e.g., PA) 128. Each of the Rx channels of the beamformer 313 may include components of the Rx path of the beamformer 122, described above, e.g., the phase shifter 130 and the amplifier (e.g., LNA) 132. Associating an individual multi-channel beamformer 313 with different ones of the blocks 210 of the antenna elements may be particularly advantageous in terms of improved routing of interconnects between various antenna elements and beamformers of an antenna apparatus.

In some embodiments, the beamformer 313 may include a Wilkinson combiner (or, more generally, any suitable RF combiner) configured to combine a plurality of (e.g., four, in this example) Rx signals into a common output signal and split equally the input Tx signal into a plurality of (e.g., nine, in this example) channels of the beamformer. In some embodiments, the Tx channels of the beamformer 313 may be separated to the extent possible to improve isolation.

In some embodiments, each of the beamformers 313 may be arranged substantially symmetrically with respect to the corresponding block 210, as is illustrated in FIG. 3A. In some embodiments, the beamformers 313 and the antenna elements 212, 214 may be physically arranged in different layers with respect to a support structure over which the beamformer arrangement 300A is provided (e.g., with respect to the substrate 114, described above). The beamformers 313 are illustrated in FIG. 3A to be "behind" some of the antenna elements 212, 214, illustrating that the beamformers 313 may be closer to the support structure than the antenna elements 212, 214 (e.g., the beamformers 313 may be in lower levels of a dielectric stack provided over a support structure, and the antenna elements 212, 214 may be in higher levels of the stack) or to illustrate that the beamformers 313 may be on the back side of the support structure while the antenna elements 212, 214 may be on the front side; however, in other embodiments, any of the beamformers 313 may be further away from the support structure than the antenna elements 212, 214, some of the beamformers 313 may be closer to the support structure while other beamformers 313 may be further away from the support structure, and any of the beamformers 313 and any of the antenna elements 212, 214 may be provided on any side of the support structure.

FIG. 3B illustrates a beamformer arrangement 300B where an antenna array may be similar to the antenna array 200A of FIG. 2A in that each 3×3 block 210 (not specifically labeled in FIG. 3B in order to not clutter the drawings, but including antenna elements labeled as 11, 12, 13, 21, 22, 23, and so on, as in FIG. 2A) may still include four antenna elements 212 and five antenna elements 214, but where the arrangement of the antenna elements 212, 214 may be different from what is shown in FIG. 2A. For an antenna array as shown in FIG. 3B, a different Tx beamformer 314 may be used for each block 310 of four antenna elements, and a different Rx beamformer 312 may be used for each block 320 encompassing four dual-mode element 212. Two of the elements within each block 320 may be Tx-only elements 214 and are not connected to the Rx beamformer 312. In FIG. 3B, only one of the beamformers 314 is labeled with a reference numeral, but nine such beamformers are shown, with identical beamformers 314 shown with the same patterns as the one labeled. Similarly, only one of the beamformers 312 is labeled with a reference numeral, but four such beamformers are shown, with identical beamformers 312 shown with the same patterns as the one labeled. This maintains the same ratio of 9/4 Tx channels to Rx channels that was shown in previous examples. Thus, FIG. 3B illustrates an embodiment where there is a 1:1 correspondence between the Tx beamformers 314 and the blocks 310, where each of the Tx beamformers 314 corresponds to one and only one of the blocks 310 and vice versa. Each of the Tx beamformers 314 may include a total of four Tx channels and may be coupled to the four antenna elements of the corresponding one of the blocks 310. Each of the Rx beamformers 312 may include a total of four Rx channels and may be coupled to the four of the antenna elements 212 of the corresponding one of the blocks 320. More generally, each of the beamformers 314 may include a plurality of channels for the wireless communication in the first direction and be coupled to a different set of four antenna elements (e.g., to a different set of four closest antenna elements) that includes any combination of the antenna elements 212 and the antenna elements 214, while each of the Rx beamformer 312 may include a plurality of channels for the wireless communication in the second direction and be coupled to a different set of four of the antenna elements 212 (e.g., to a different set of four closest antenna elements 212). Each of the Tx channels of the beamformers 314 may include components of the Tx path of the beamformer 122, described above, e.g., the phase shifter 126 and the amplifier (e.g., PA) 128. Each of the Rx channels of the beamformers 312 may include components of the Rx path of the beamformer 122, described above, e.g., the phase shifter 130 and the amplifier (e.g., LNA) 132. The beamformer arrangement as shown in FIG. 3B may be particularly advantageous in terms of reducing and/or equalizing trace lengths between various antenna elements and beamformers of an antenna apparatus as compared to the arrangement in FIG. 3A. Shorter trace lengths leads to less loss and better Tx and Rx performance.

In some embodiments, each of the beamformers 314 may be arranged substantially symmetrically with respect to the corresponding block 310, as is illustrated in FIG. 3B. In some embodiments, each of the beamformers 312 may be arranged substantially symmetrically with respect to the corresponding block 320, as is illustrated in FIG. 3B. In some embodiments, any of the beamformers 312, 314 and the antenna elements 212, 214 may be physically arranged in same or different layers with respect to a support structure over which the beamformer arrangement 300B is provided (e.g., with respect to the substrate 114, described above).

FIG. 3C illustrates a beamformer arrangement 300C that is similar to the beamformer arrangement 300B of FIG. 3B, but where the arrangement of the antenna elements 212, 214 and the placement of the beamformers 312 may be different from what is shown in FIG. 3B. For an antenna array as shown in FIG. 3C, a different Tx beamformer 314 may be used for each block 310 of four antenna elements, substantially the same as described with reference to FIG. 3B, and a different Rx beamformer 312 may be used for each block 320, except that in FIG. 3C each block 320 includes only the closest four antenna elements, all of them being the antenna elements 212. Thus, the trace lengths from the Rx beamformer 312 to the four dual-mode elements 212 may be even shorter than in FIG. 3B.

The phased arrays shown in FIGS. 2A-2D illustrate arrays where there are more antenna elements for Tx than for Rx. In further embodiments, in order to achieve target performance for Rx, a phased array may include additional Rx antenna elements, so that the total number of the antenna elements for Tx and the total number of the antenna elements for Rx may be comparable (e.g., substantially equal). Considerations with respect to areas occupied by such arrays are described with reference to FIG. 4 and one example implementation of such a phased array is shown in FIG. 5.

Figure 4:
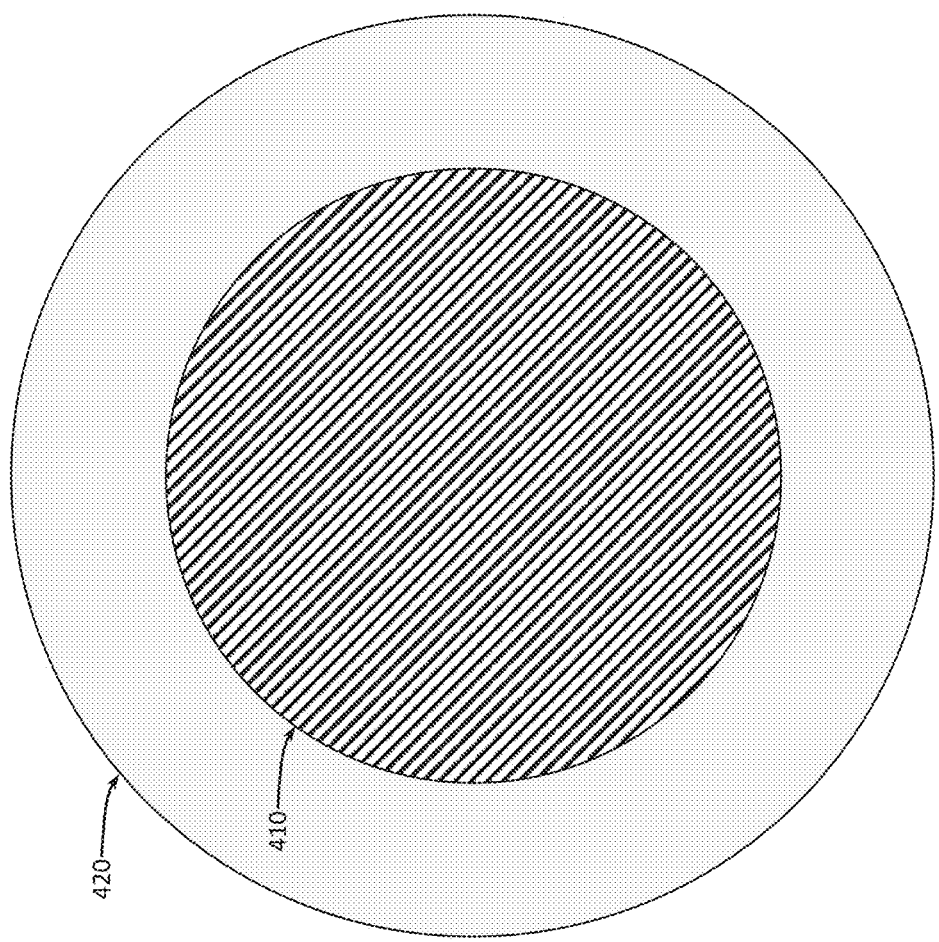
FIG. 4 provides a schematic illustration of relative surface areas that may be occupied by a non-uniformly thinned half-duplex phased array with dual-band antenna elements and an additional array of Rx antenna elements, according to some embodiments of the present disclosure.

FIG. 4 provides a schematic illustration of relative surface areas that may be occupied by a non-uniformly thinned half-duplex phased array with dual-band antenna elements and an additional array of Rx antenna elements, according to some embodiments of the present disclosure. In FIG. 4, an area 410 represents a surface area that may be occupied by a non-uniformly thinned half-duplex phased array with both Tx-only and dual-band antenna elements, such as any of the phased arrays 200A-200D. As described above, the individual spacing between antenna elements of the array in the area 410 may be about 5 mm, for the example of 20 GHz Rx band and 30 GHz Tx band. On the other hand, an area 420 represents a surface area that may be occupied by an additional array of Rx antenna elements (when the Rx band is lower in frequency than the Tx band), added so that the total number of the antenna elements for Tx and the total number of the antenna elements for Rx may be comparable (e.g., substantially equal). This additional area may be needed to obtain a comparable amount of antenna gain between the Tx and Rx array since gain is proportional to frequency squared. The individual spacing between antenna elements of the array in the area 420 may be about 7.5 mm, for the example of 20 GHz Rx band. FIG. 4 illustrates that, for the example of relative Tx/Rx frequencies described herein, the total area occupied by the antenna elements to be used for Rx (i.e., a sum of the area 410 that includes the dual-band antenna elements 212 to be used for Rx and the area 420 that includes additional Rx antenna elements) is larger than the total area occupied by the antenna elements to be used for Tx (i.e., only the area 410 that includes the dual-band antenna elements 212 to be used for Tx and the Tx antenna elements 214). Circular areas are shown, but these might also be other shapes such as square, octagonal, or any other polygonal shape.

In some embodiments, a different instance of a beamformer (e.g., the beamformer 300) may be used for each group of antenna elements of the array in the area 410 (e.g., for each block 210 of nine antenna elements as described with reference to the phased arrays 200A-200D of FIGS. 2A-2D). In some embodiments, different instance of a beamformer (e.g., a beamformer similar to the beamformer 300 in that it may be multi-channel but include only Rx channels) may be used for each group of antenna elements of the array in the area 420 (e.g., for each block four Rx antenna elements of the area 420 a beamformer like the beamformer 300 but including only the four Rx channels and no Tx channels may be used to avoid wasted/unused Tx channels).

Figure 5:
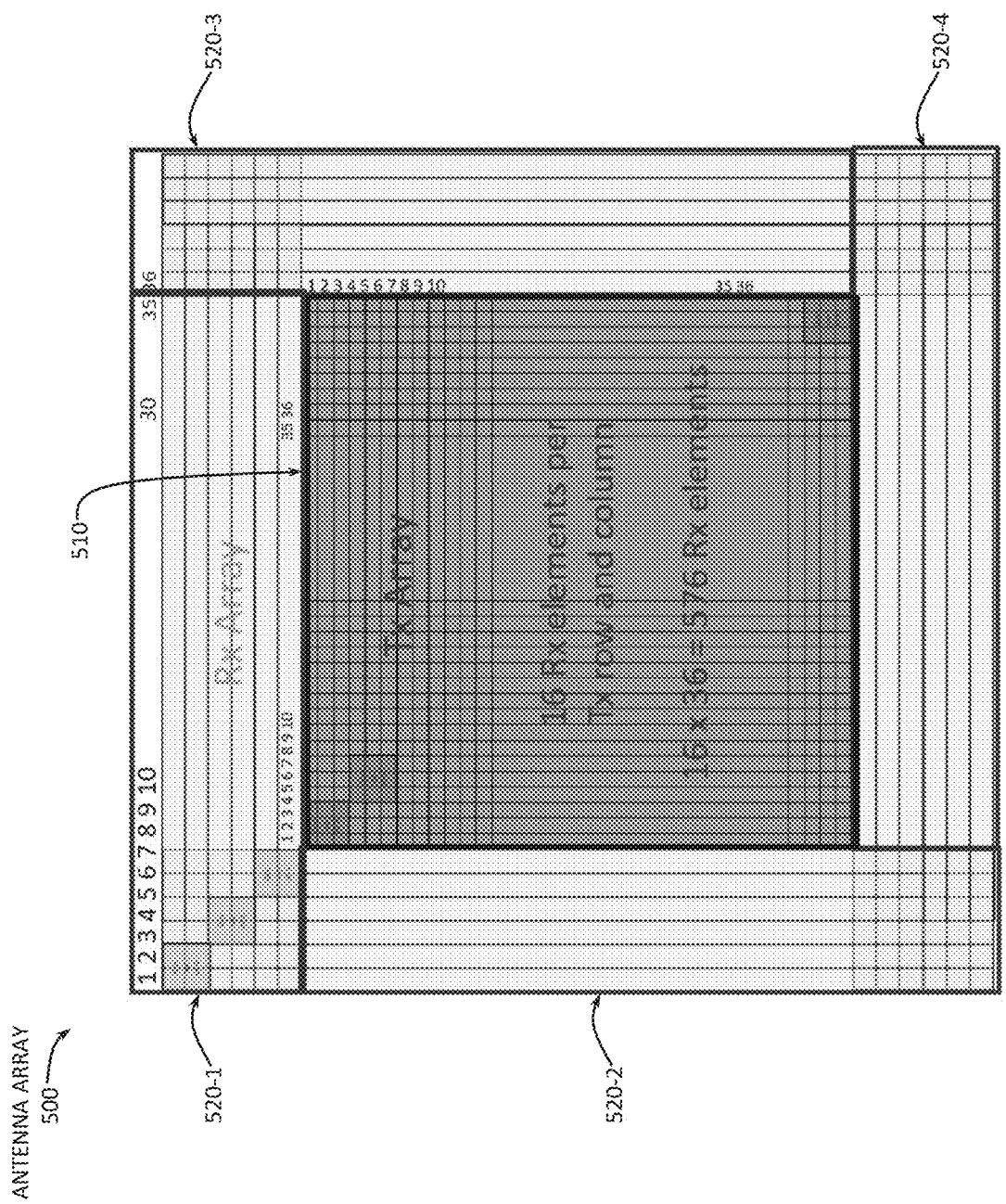
FIG. 5 provides a schematic illustration of an example antenna array in which a non-uniformly thinned half-duplex phased array with dual-band antenna elements may be implemented, according to some embodiments of the present disclosure.

FIG. 5 provides a schematic illustration of an example antenna array 500 in which a non-uniformly thinned half-duplex phased array with dual-band antenna elements may be implemented, according to some embodiments of the present disclosure. The antenna array 500 illustrates 5 separate portions (sub-arrays): a sub-array 510 (shown in the center of the antenna array 500, in a dark grey color) and sub-arrays 520-1 through 520-4 arranged around the periphery of the antenna array 500, around the sub-array 510, although in other embodiments relative placement of these sub-arrays may be different from what is shown in FIG. 5.

The sub-array 510 may be a non-uniformly thinned half-duplex phased array with dual-band antenna elements and an additional array of Rx antenna elements, such as any of the phased arrays 200A-200D. For example, the sub-array 510 may be the array occupying the area 410 of the illustration of FIG. 4. FIG. 5 illustrates an example where the sub-array 510 is a square array of 36 columns and 36 rows, i.e., a total of 1296 antenna elements (36*36=1296), e.g., separated into the blocks 210 of 9 antenna elements each as described above. The separation of the antenna elements of the sub-array 510 into blocks of, e.g., 9, may be useful so that an individual beamformer may be used for each of the blocks, as described above with reference to the area 410 of FIG. 4. Thus, the sub-array 510 may include a total of 16 antenna elements to be used for Rx per Tx row and column, e.g., 16 dual-band antenna elements 212 as described above $$\left(36 * \frac{4}{9} = 16\right),$$

resulting in a total of 576 antenna elements to be used for Rx in the sub-array 510 (16*36=576). The other 720 antenna elements of the sub-array 510 are the Tx antenna elements 214 as described above $$\left(36 * \frac{5}{9} = 20, 20 * 36 = 720\right).$$

The sub-array 510 may include a total of 1296 antenna elements to be used for Tx, e.g., 576 dual-band antenna elements 212 as described above and the remaining 720 of the Tx antenna elements 214.

Since the sub-array 510 includes a total of 1296 antenna elements to be used for Tx but only a total of 576 antenna elements to be used for Rx, additional Rx antenna elements may be added by means of the sub-arrays 520-1 through 520-4 to achieve target performance. For example, together, the sub-arrays 520-1 through 520-4 may be the array occupying the area 420 of the illustration of FIG. 4. FIG. 5 illustrates an example where each of the sub-arrays 520-1 through 520-4 is a rectangular array of 30 columns and 6 rows, i.e., a total of 180 antenna elements (30*6=180), e.g., separated into square blocks of 4 (2×2) Rx antenna elements. Thus, all of the sub-arrays 520-1 through 520-4 include a total of 720 Rx antenna elements (180*4=720). The separation of the Rx antenna elements of the sub-arrays 520-1 through 520-4 into blocks of, e.g., 4, may be useful so that an individual beamformer may be used for each of the blocks, as described above with reference to the area 420 of FIG. 4.

The Rx antenna elements of the sub-arrays 520-1 through 520-4 may have spacing of about 7.5 mm, as described above, while the antenna elements of the sub-array 510 may have spacing of about 5 mm.

Example RF System

Figure 6:
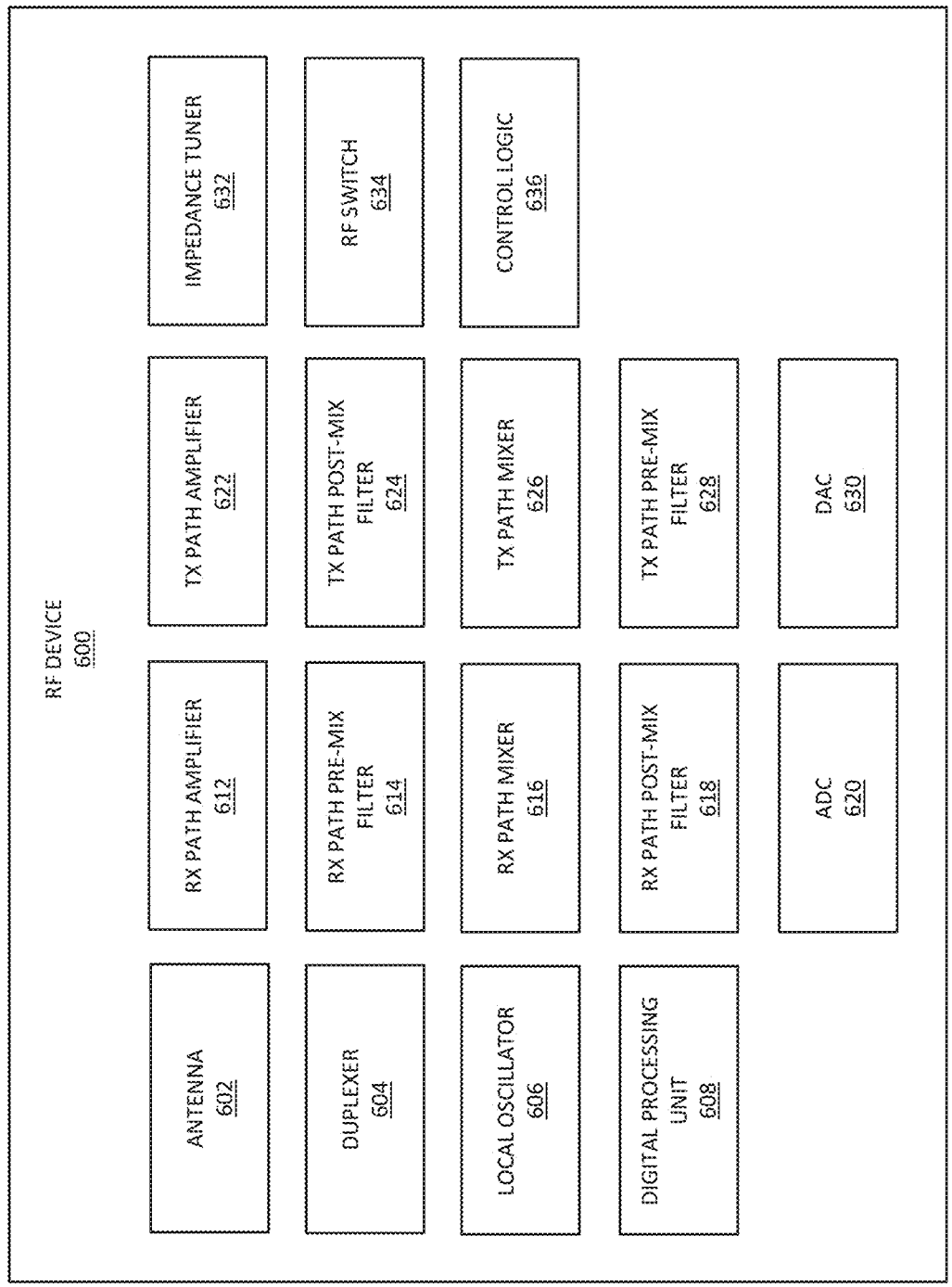
FIG. 6 provides an example phased array schematic block diagram illustrating an RF device in which non-uniformly thinned half-duplex phased arrays with dual-band antenna elements may be implemented, according to some embodiments of the present disclosure.

In some embodiments, non-uniformly thinned half-duplex phased arrays with dual-band antenna elements as described herein may be included in various RF devices and systems used in wireless communications. For illustration purposes only, one example RF device that may include any of the non-uniformly thinned half-duplex phased arrays with dual-band antenna elements described herein is shown in FIG. 6 and described below. However, in general, non-uniformly thinned half-duplex phased arrays with dual-band antenna elements as described herein may be included in other RF devices and systems, all of which being within the scope of the present disclosure.

FIG. 6 is a block diagram of an example RF device 600, e.g., an RF transceiver, in which non-uniformly thinned half-duplex phased arrays with dual-band antenna elements may be implemented, according to some embodiments of the present disclosure.

In general, the RF device 600 may be any device or system that may support wireless transmission and/or reception of signals in the form of electromagnetic waves in the RF range of approximately 3 kHz to approximately 300 GHz. In some embodiments, the RF device 600 may be used for wireless communications, e.g., in a base station (BS) or a user equipment (UE) device of any suitable cellular wireless communications technology, such as GSM, WCDMA, or LTE. In a further example, the RF device 600 may be used as, or in, e.g., a BS or a UE device of a mm-wave wireless technology such as 5G wireless (i.e., high-frequency/short-wavelength spectrum, e.g., with frequencies in the range between about 20 and 60 GHz, corresponding to wavelengths in the range between about 5 and 15 millimeters). In yet another example, the RF device 600 may be used for wireless communications using Wi-Fi technology (e.g., a frequency band of 2.4 GHz, corresponding to a wavelength of about 7 cm, or a frequency band of 5.8 GHz, spectrum, corresponding to a wavelength of about 5 cm), e.g., in a Wi-Fi-enabled device such as a desktop, a laptop, a video game console, a smart phone, a tablet, a smart TV, a digital audio player, a car, a printer, etc. In some implementations, a Wi-Fi-enabled device may, e.g., be a node in a smart system configured to communicate data with other nodes, e.g., a smart sensor. Still in another example, the RF device 600 may be used for wireless communications using Bluetooth technology (e.g., a frequency band from about 2.4 to about 2.485 GHz, corresponding to a wavelength of about 7 cm). In other embodiments, the RF device 600 may be used for transmitting and/or receiving RF signals for purposes other than communication, e.g., in an automotive radar system, or in medical applications such as MRI.

In various embodiments, the RF device 600 may be included in frequency-division duplex (FDD) or time-division duplex (TDD) variants of frequency allocations that may be used in a cellular network. In an FDD system, the uplink (i.e., RF signals transmitted from the UE devices to a BS) and the downlink (i.e., RF signals transmitted from the BS to the UE devices) may use separate frequency bands at the same time. In a TDD system, the uplink and the downlink may use the same frequencies but at different times.

Several components are illustrated in FIG. 6 as included in the RF device 600, but any one or more of these components may be omitted or duplicated, as suitable for the application. For example, in some embodiments, the RF device 600 may be an RF device supporting both of wireless transmission and reception of RF signals (e.g., an RF transceiver), in which case it may include both the components of what is referred to herein as a (Tx) path and the components of what is referred to herein as a receive (Rx) path. However, in other embodiments, the RF device 600 may be an RF device supporting only wireless reception (e.g., an RF receiver), in which case it may include the components of the Rx path, but not the components of the Tx path; or the RF device 600 may be an RF device supporting only wireless transmission (e.g., an RF transmitter), in which case it may include the components of the Tx path, but not the components of the Rx path.

In some embodiments, some or all the components included in the RF device 600 may be attached to one or more motherboards. In some embodiments, some or all these components are fabricated on a single die, e.g., on a single system on chip (SOC) die.

Additionally, in various embodiments, the RF device 600 may not include one or more of the components illustrated in FIG. 6, but the RF device 600 may include interface circuitry for coupling to the one or more components. For example, the RF device 600 may not include a digital processing unit 608 but may include interface circuitry (e.g., connectors and supporting circuitry) to which the digital processing unit 608 may be coupled. In another example, the RF device 600 may not include a LO 606, but may include interface circuitry (e.g., connectors and supporting circuitry) to which the LO 606 may be coupled.

As shown in FIG. 6, the RF device 600 may include an antenna 602, a duplexer 604 (e.g., if the RF device 600 is an FDD RF device; otherwise, the duplexer 604 may be omitted), an LO 606, a digital processing unit 608. As also shown in FIG. 6, the RF device 600 may include an Rx path that may include an Rx path amplifier 612, an Rx path pre-mix filter 614, a Rx path mixer 616, an Rx path post-mix filter 618, and an ADC 620. As further shown in FIG. 6, the RF device 600 may include a Tx path that may include a Tx path amplifier 622, a Tx path post-mix filter 624, a Tx path mixer 626, a Tx path pre-mix filter 628, and a DAC 630. Still further, the RF device 600 may further include an impedance tuner 632, an RF switch 634, and control logic 636. In various embodiments, the RF device 600 may include multiple instances of any of the components shown in FIG. 6. In some embodiments, the Rx path amplifier 612, the Tx path amplifier 622, the duplexer 604, and the RF switch 634 may be considered to form, or be a part of, an RF front-end (FE) of the RF device 600. In some embodiments, the Rx path amplifier 612, the Tx path amplifier 622, the duplexer 604, and the RF switch 634 may be considered to form, or be a part of, an RF FE of the RF device 600. In some embodiments, the Rx path mixer 616 and the Tx path mixer 626 (possibly with their associated pre-mix and post-mix filters shown in FIG. 6) may be considered to form, or be a part of, an RF transceiver of the RF device 600 (or of an RF receiver or an RF transmitter if only Rx path or Tx path components, respectively, are included in the RF device 600). In some embodiments, the RF device 600 may further include one or more control logic elements/circuits, shown in FIG. 6 as control logic 636, e.g., an RF FE control interface. In some embodiments, the control logic 636 may be used to perform functions such as enhance control of complex RF system environment, support implementation of envelope tracking techniques, or reduce dissipated power within the RF device 600. In some embodiments, the control logic 636 may control operation of non-uniformly thinned half-duplex phased arrays with dual-band antenna elements as described herein.

The antenna 602 may be configured to wirelessly transmit and/or receive RF signals in accordance with any wireless standards or protocols, e.g., Wi-Fi, LTE, or GSM, as well as any other wireless protocols that are designated as 3G, 4G, 5G, and beyond. If the RF device 600 is an FDD transceiver, the antenna 602 may be configured for concurrent reception and transmission of communication signals in separate, i.e., non-overlapping and non-continuous, bands of frequencies, e.g., in bands having a separation of, e.g., 20 MHz from one another. If the RF device 600 is a TDD transceiver, the antenna 602 may be configured for sequential reception and transmission of communication signals in bands of frequencies that may be the same or overlapping for Tx and Rx paths. In some embodiments, the RF device 600 may be a multi-band RF device, in which case the antenna 602 may be configured for concurrent reception of signals having multiple RF components in separate frequency bands and/or configured for concurrent transmission of signals having multiple RF components in separate frequency bands. In such embodiments, the antenna 602 may be a single wideband antenna or a plurality of band-specific antennas (i.e., a plurality of antennas each configured to receive and/or transmit signals in a specific band of frequencies). In various embodiments, the antenna 602 may be a non-uniformly thinned half-duplex phased array with dual-band antenna elements as described herein. In some embodiments, the RF device 600 may include more than one antenna 602 to implement antenna diversity. In some such embodiments, the RF switch 634 may be deployed to switch between different antennas.

An output of the antenna 602 may be coupled to the input of the duplexer 604. The duplexer 604 may be any suitable component configured for filtering multiple signals to allow for bidirectional communication over a single path between the duplexer 604 and the antenna 602. The duplexer 604 may be configured for providing Rx signals to the Rx path of the RF device 600 and for receiving Tx signals from the Tx path of the RF device 600.

The RF device 600 may include one or more LOs 606, configured to provide LO signals that may be used for downconversion of the RF signals received by the antenna 602 and/or upconversion of the signals to be transmitted by the antenna 602.

The RF device 600 may include the digital processing unit 608, which may include one or more processing devices. The digital processing unit 608 may be configured to perform various functions related to digital processing of the Rx and/or Tx signals. Examples of such functions include, but are not limited to, decimation/downsampling, error correction, digital downconversion or upconversion, DC offset cancellation, automatic gain control, etc. Although not shown in FIG. 6, in some embodiments, the RF device 600 may further include a memory device, configured to cooperate with the digital processing unit 608.

Turning to the details of the Rx path that may be included in the RF device 600, the Rx path amplifier 612 may include a LNA. An input of the Rx path amplifier 612 may be coupled to an antenna port (not shown) of the antenna 602, e.g., via the duplexer 604. The Rx path amplifier 612 may amplify the RF signals received by the antenna 602.

An output of the Rx path amplifier 612 may be coupled to an input of the Rx path pre-mix filter 614, which may be a harmonic or band-pass (e.g., low-pass) filter, configured to filter received RF signals that have been amplified by the Rx path amplifier 612.

An output of the Rx path pre-mix filter 614 may be coupled to an input of the Rx path mixer 616, also referred to as a downconverter. The Rx path mixer 616 may include two inputs and one output. A first input may be configured to receive the Rx signals, which may be current signals, indicative of the signals received by the antenna 602 (e.g., the first input may receive the output of the Rx path pre-mix filter 614). A second input may be configured to receive LO signals from one of the LOs 606. The Rx path mixer 616 may then mix the signals received at its two inputs to generate a downconverted Rx signal, provided at an output of the Rx path mixer 616. As used herein, downconversion refers to a process of mixing a received RF signal with an LO signal to generate a signal of a lower frequency. In particular, the Rx path mixer (e.g., downconverter) 616 may be configured to generate the sum and/or the difference frequency at the output port when two input frequencies are provided at the two input ports. In some embodiments, the RF device 600 may implement a direct-conversion receiver (DCR), also known as homodyne, synchrodyne, or zero-IF receiver, in which case the Rx path mixer 616 may be configured to demodulate the incoming radio signals using LO signals whose frequency is identical to, or very close to the carrier frequency of the radio signal. In other embodiments, the RF device 600 may make use of downconversion to the IF. IFs may be used in superheterodyne radio receivers, in which a received RF signal is shifted to an IF before the final detection of the information in the received signal is done. In some embodiments, the Rx path mixer 616 may include several stages of IF conversion.

Although a single Rx path mixer 616 is shown in the Rx path of FIG. 6, in some embodiments, the Rx path mixer 616 may be implemented as a quadrature downconverter, in which case it would include a first RX path mixer and a second Rx path mixer. The first Rx path mixer may be configured for performing downconversion to generate an in-phase (I) downconverted Rx signal by mixing the Rx signal received by the antenna 602 and an in-phase component of the LO signal provided by the LO 606. The second Rx path mixer may be configured for performing downconversion to generate a quadrature (Q) downconverted Rx signal by mixing the Rx signal received by the antenna 602 and a quadrature component of the LO signal provided by the local oscillator 606 (the quadrature component is a component that is offset, in phase, from the in-phase component of the local oscillator signal by 90 degrees). The output of the first Rx path mixer may be provided to a I-signal path, and the output of the second Rx path mixer may be provided to a Q-signal path, which may be substantially 90 degrees out of phase with the I-signal path.

The output of the Rx path mixer 616 may, optionally, be coupled to the Rx path post-mix filter 618, which may be low-pass filters. In case the Rx path mixer 616 is a quadrature mixer that implements the first and second mixers as described above, the IQ components provided at the outputs of the first and second mixers respectively may be coupled to respective individual first and second Rx path post-mix filters included in the filter 618.

The ADC 620 may be configured to convert the mixed Rx signals from the Rx path mixer 616 from analog to digital domain. The ADC 620 may be a quadrature ADC that, like the Rx path quadrature mixer 616, may include two ADCs, configured to digitize the downconverted Rx path signals separated in IQ components. The output of the ADC 620 may be provided to the digital processing unit 608, configured to perform various functions related to digital processing of the Rx signals so that information encoded in the Rx signals can be extracted.

Turning to the details of the Tx path that may be included in the RF device 600, the digital signal to later be transmitted (Tx signal) by the antenna 602 may be provided, from the digital processing unit 608, to the DAC 630. Like the ADC 620, the DAC 630 may include two DACs, configured to convert, respectively, digital I- and Q-path TX signal components to analog form.

Optionally, the output of the DAC 630 may be coupled to the Tx path pre-mix filter 628, which may be a band-pass (e.g., low-pass) filter (or a pair of band-pass, e.g., low-pass, filters, in case of quadrature processing) configured to filter out, from the analog Tx signals output by the DAC 630, the signal components outside of the desired band. The digital Tx signals may then be provided to the Tx path mixer 626, which may also be referred to as an upconverter. Like the Rx path mixer 616, the Tx path mixer 626 may include a pair of Tx path mixers, for IQ component mixing. Like the first and second Rx path mixers that may be included in the Rx path, each of the Tx path mixers of the Tx path mixer 626 may include two inputs and one output. A first input may receive the Tx signal components, converted to the analog form by the respective DAC 630, which are to be upconverted to generate RF signals to be transmitted. The first Tx path mixer may generate an in-phase (I) upconverted signal by mixing the Tx signal component converted to analog form by the DAC 630 with the in-phase component of the Tx path LO signal provided from the LO 606 (in various embodiments, the LO 606 may include a plurality of different LOs or be configured to provide different LO frequencies for the mixer 616 in the Rx path and the mixer 626 in the Tx path). The second Tx path mixer may generate a quadrature phase (Q) upconverted signal by mixing the Tx signal component converted to analog form by the DAC 630 with the quadrature component of the Tx path LO signal. The output of the second Tx path mixer may be added to the output of the first Tx path mixer to create a real RF signal. A second input of each of the Tx path mixers may be coupled the LO 606.

Optionally, the RF device 600 may include the Tx path post-mix filter 624, configured to filter the output of the Tx path mixer 626.

The Tx path amplifier 622 may include an array of power amplifiers.

In various embodiments, any of the Rx path pre-mix filter 614, the Rx path post-mix filter 618, the Tx post-mix filter 624, and the Tx pre-mix filter 628 may be implemented as RF filters. In some embodiments, an RF filter may be implemented as a plurality of RF filters, or a filter bank. A filter bank may include a plurality of RF filters that may be coupled to a switch, e.g., the RF switch 634, configured to selectively switch any one of the plurality of RF filters on and off (e.g., activate any one of the plurality of RF filters), in order to achieve desired filtering characteristics of the filter bank (i.e., in order to program the filter bank). For example, such a filter bank may be used to switch between different RF frequency ranges when the RF device 600 is, or is included in, a BS or in a UE device. In another example, such a filter bank may be programmable to suppress Tx leakage on the different duplex distances.

The impedance tuner 632 may include any suitable circuitry, configured to match the input and output impedances of the different RF circuitries to minimize signal losses in the RF device 600. For example, the impedance tuner 632 may include an antenna impedance tuner. Being able to tune the impedance of the antenna 602 may be particularly advantageous because antenna's impedance is a function of the environment that the RF device 600 is in, e.g., antenna's impedance changes depending on, e.g., if the antenna is held in a hand, placed on a car roof, etc.

As described above, the RF switch 634 may be a device configured to route high-frequency signals through transmission paths, e.g., in order to selectively switch between a plurality of instances of any one of the components shown in FIG. 6, e.g., to achieve desired behavior and characteristics of the RF device 600. For example, in some embodiments, an RF switch may be used to switch between different antennas 602. In other embodiments, an RF switch may be used to switch between a plurality of RF filters (e.g., by selectively switching RF filters on and off) of the RF device 600. Typically, an RF system would include a plurality of such RF switches.

The RF device 600 provides a simplified version and, in further embodiments, other components not specifically shown in FIG. 6 may be included. For example, the Rx path of the RF device 600 may include a current-to-voltage amplifier between the Rx path mixer 616 and the ADC 620, which may be configured to amplify and convert the down-converted signals to voltage signals. In another example, the Rx path of the RF device 600 may include a balun transformer for generating balanced signals. In yet another example, the RF device 600 may further include a clock generator, which may, e.g., include a suitable phased-lock loop (PLL), configured to receive a reference clock signal and use it to generate a different clock signal that may then be used for timing the operation of the ADC 620, the DAC 630, and/or that may also be used by the LO 606 to generate the local oscillator signals to be used in the Rx path or the Tx path.

Example Data Processing System

Figure 7:
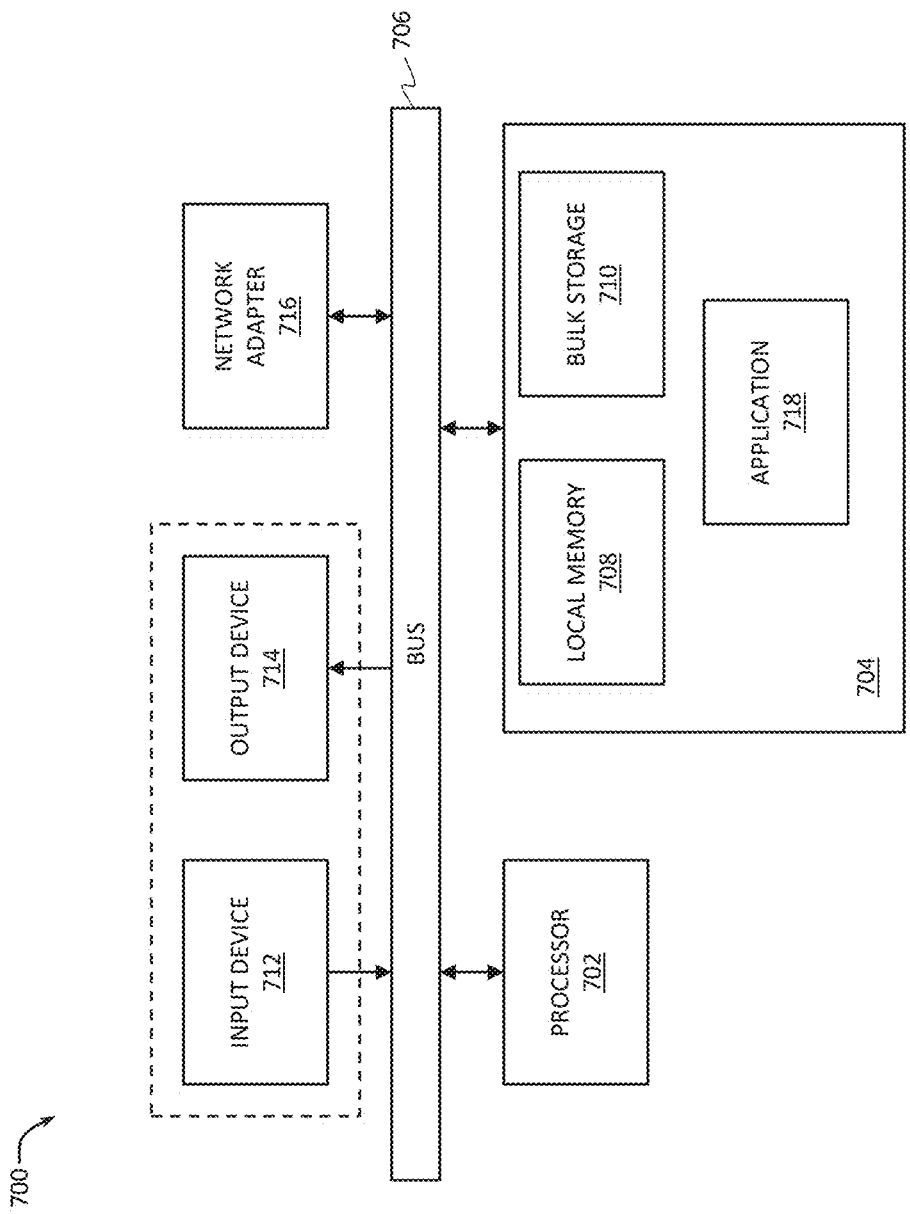
FIG. 7 provides a block diagram illustrating an example data processing system that may be configured to implement, or control, at least portions of operating non-uniformly thinned half-duplex phased arrays with dual-band antenna elements, according to some embodiments of the present disclosure.

FIG. 7 provides a block diagram illustrating an example data processing system 700 that may be configured to implement, or control implementations of, at least portions of systems and methods for operating non-uniformly thinned half-duplex phased arrays with dual-band antenna elements as described herein. For example, the data processing system 700 may include, or be included in, a control processor of a phase antenna array, e.g., the data processing system 700 may include, or be included in the control logic 636, shown in FIG. 6, according to some embodiments of the present disclosure.

As shown in FIG. 7, the data processing system 700 may include at least one processor 702, e.g., a hardware processor 702, coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this disclosure, in particular functions related to operating non-uniformly thinned half-duplex phased arrays with dual-band antenna elements as described herein.

In some embodiments, the processor 702 can execute software or an algorithm to perform the activities as discussed in this specification, in particular activities related to operating non-uniformly thinned half-duplex phased arrays with dual-band antenna elements as described herein. The processor 702 may include any combination of hardware, software, or firmware providing programmable logic, including by way of non-limiting example a microprocessor, a digital signal processor (DSP), a field-programmable gate array (FPGA), a programmable logic array (PLA), an application specific integrated circuit (ASIC), or a virtual machine processor. The processor 702 may be communicatively coupled to the memory element 704, for example in a direct-memory access (DMA) configuration, so that the processor 702 may read from or write to the memory elements 704.

In general, the memory elements 704 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 700 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any of the circuits/components shown in FIGS. 1-3 and FIG. 6, can also include suitable interfaces for receiving, transmitting, and/or otherwise communicating data or information in a network environment so that they can communicate with, e.g., the data processing system 700 of another one of these elements.

In certain example implementations, mechanisms for operating non-uniformly thinned half-duplex phased arrays with dual-band antenna elements as described herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as the memory elements 704 shown in FIG. 7, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as the processor 702 shown in FIG. 7, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 704 may include one or more physical memory devices such as, for example, local memory 708 and one or more bulk storage devices 710. The local memory may refer to RAM or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

As shown in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

Input/output (I/O) devices depicted as an input device 712 and an output device 714, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 714 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 714. Input and/or output devices 712, 714 may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as a stylus or a finger of a user, on or near the touch screen display.

A network adapter 716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

Variations and Implementations

While embodiments of the present disclosure were described above with references to exemplary implementations as shown in FIGS. 1-7, a person skilled in the art will realize that the various teachings described above are applicable to a large variety of other implementations.

For example, while some embodiments were described with reference to 20 GHz Rx band and 30 GHz Tx band, these descriptions may be generalized to N*10 GHz Rx band and M*10 GHz Tx band, where N and M may be any positive number, not necessarily an integer (for the example above N=2 and M=3).

If M is greater than N, then a non-uniformly thinned half-duplex phased array with dual-band antenna elements such as any of the phased arrays 200A-200D or 510, described above, may include a total of K antenna elements, out of which $$\frac{N^2}{M^2} * K$$

antenna elements may be dual-band antenna elements such as the dual-band antenna elements 212, while the rest of the antenna elements (i.e., $$\frac{M^2 - N^2}{M^2} * K$$

antenna elements) may be Tx antenna element such as the Tx antenna element 214. Antenna elements of such a non-uniformly thinned half-duplex phased array of K antenna elements may be separated/spaced by a distance that is substantially equal to half of $\lambda_{Tx}$, where $\lambda_{Tx}$ is a wavelength of the center frequency of the Tx band, resulting in a substantially half of $\lambda_{Tx}$ separation between antenna elements used for Tx (i.e., a total of the Tx antenna elements and the dual-band antenna elements of the non-uniformly thinned half-duplex phased array), but only an average of substantially half of $\lambda_{Rx}$ separation between antenna elements used for Rx (i.e., only the dual-band antenna elements of the non-uniformly thinned half-duplex phased array), where $\lambda_{Rx}$ is a wavelength of the center frequency of the Rx band. Furthermore, in some embodiments, antenna elements of such an array may be arranged in $$\frac{K}{M^2}$$

blocks of $M^2$ antenna elements, similar to the blocks 210, described above, where each block may include $N^2$ dual-band antenna elements and $M^2-N^2$ Tx antenna elements. An individual multi-channel beamformer may be associated with each such block, similar to the beamformer 300, described above, the beamformer having $N^2$ Rx channels and $M^2$ Tx channels. When comparable Tx and Rx antenna gain is desired, a complete phased array may then also include an additional array of antenna elements, e.g., as described with reference to FIGS. 4 and 5 (e.g., an additional array that is a combination/total of sub-arrays 520-1 through 520-4, described above), by adding about $$\frac{M^2 - N^2}{M^2} * K \ Rx$$

antenna elements, separated/spaced by a distance that is substantially equal to half of $\lambda_{Rx}$, the wavelength of the center frequency of the Rx band. In some embodiments, antenna elements of such an additional array may be arranged in $$\frac{M^2 - N^2}{4M^2} * K$$

blocks of 4 antenna elements, similar to the blocks of the sub-arrays 520, described above, where each block may include 4 Rx antenna elements. An individual multi-channel beamformer may be associated with each such block of 4 Rx antenna elements, similar to the beamformer 300, described above, the beamformer having 4 Rx channels (and, e.g., no Tx channels or at least no active Tx channels).

On the other hand, if N is greater than M, then a non-uniformly thinned half-duplex phased array with dual-band antenna elements such as any of the arrays 200A, 200B, or 510, described above, may include a total of K antenna elements, out of which $$\frac{M^2}{N^2} * K$$

antenna elements may be dual-band antenna elements such as the dual-band antenna elements 212, while the rest of the antenna elements (i.e., $$\frac{N^2 - M^2}{N^2} * K$$

antenna elements) may be Rx antenna elements (i.e., antenna elements similar to the antenna elements 214 but for Rx instead of Tx). Antenna elements of such a non-uniformly thinned half-duplex phased array of K antenna elements may be separated/spaced by a distance that is substantially equal to half of $\lambda_{Rx}$, the wavelength of the center frequency of the Rx band, resulting in a substantially half of $\lambda_{Rx}$ separation between antenna elements used for Rx (i.e., a total of the Rx antenna elements and the dual-band antenna elements of the non-uniformly thinned half-duplex phased array), but only an average of substantially half of $\lambda_{Tx}$ separation between antenna elements used for Tx (i.e., only the dual-band antenna elements of the non-uniformly thinned half-duplex phased array). Furthermore, in some embodiments, antenna elements of such an array may be arranged in $$\frac{K}{N^2}$$

blocks of $N^2$ antenna elements, similar to the blocks 210, described above, where each block may include $M^2$ dual-band antenna elements and $N^2-M^2$ Rx antenna elements. An individual multi-channel beamformer may be associated with each such block, similar to the beamformer 300, described above, the beamformer having $M^2$ Tx channels and $N^2$ Rx channels. When comparable Tx and Rx antenna gain is desired, a complete phased array may then also include an additional array of antenna elements, e.g., as described with reference to FIGS. 4 and 5 (e.g., an additional array that is similar to a combination/total of sub-arrays 520-1 through 520-4, described above, except that all antenna elements are Tx antenna elements instead of Rx antenna elements), by adding about $$\frac{N^2 - M^2}{N^2} * K \ Tx$$

antenna elements, separated/spaced by a distance that is substantially equal to half of $\lambda_{Tx}$, the wavelength of the center frequency of the Tx band. In some embodiments, antenna elements of such an additional array may be arranged in $$\frac{N^2 - M^2}{4N^2} * K$$

blocks of 4 antenna elements, similar to the blocks of the sub-arrays 520, described above, where each block may include 4 Tx antenna elements. An individual multi-channel beamformer may be associated with each such block of 4 Tx antenna elements, similar to the beamformer 300, described above, the beamformer having 4 Tx channels (and, e.g., no Rx channels or at least no active Rx channels).

In another example, descriptions provided herein are applicable not only to satellite systems, which provide one example of wireless communication systems, but also to other wireless communication systems such as, but not limited to, cellular communication systems such as GSM or LTE. In yet another example, descriptions provided herein are applicable not only to wireless communication systems, but also to any other systems where phased arrays may be used, such as radar systems.

In certain contexts, the features discussed herein can be applicable to automotive systems, medical systems, scientific instrumentation, wireless and wired communications, radio, radar, and digital-processing-based systems.

In the discussions of the embodiments above, components of a system, such as beamformers, phase shifters, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to non-uniformly thinned half-duplex phased arrays with dual-band antenna elements as described herein.

In one example embodiment, any number of electrical circuits of the present drawings may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present drawings may be implemented as stand-alone modules (e.g., a device with associated components and circuitry configured to perform a specific application or function) or implemented as plug-in modules into application specific hardware of electronic devices. Note that particular embodiments of the present disclosure may be readily included in a SOC package, either in part, or in whole. An SOC represents an integrated circuit (IC) that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components shown in the systems of FIGS. 1-7) have only been offered for purposes of example and teaching only. Such information may be varied considerably without departing from the spirit of the present disclosure. It should be appreciated that the system can be consolidated in any suitable manner. Along similar design alternatives, any of the illustrated circuits, components, modules, and elements of the present drawings may be combined in various possible configurations, all of which are clearly within the broad scope of this specification. In the foregoing description, example embodiments have been described with reference to particular component arrangements. Various modifications and changes may be made to such embodiments without departing from the scope of the present disclosure. The description and drawings are, accordingly, to be regarded in an illustrative rather than in a restrictive sense.

SELECT EXAMPLES

The following paragraphs provide various examples of the embodiments disclosed herein.

Example 1 provides an antenna apparatus for supporting a wireless communication in a first direction in a band having a first center frequency and supporting a wireless communication in a second direction in a band having a second center frequency, the second center frequency being lower than the first center frequency. The antenna apparatus includes a support structure and an antenna array including antenna elements arranged on the support structure in an arrangement so that antenna elements of a first subset of the antenna elements at a periphery of the arrangement and antenna elements of a second subset of the antenna elements are within the periphery. In such an antenna apparatus, the antenna elements include first antenna elements and second antenna elements, each of the first antenna elements is to support the wireless communication in the first direction without supporting the wireless communication in the second direction (e.g., the first antenna elements may be the single-band antenna elements 214 as described herein), each of the second antenna elements is to support both the wireless communication in the first direction and the wireless communication in the second direction (e.g., the second antenna elements may be the dual-band antenna elements 212 as described herein), and the arrangement is such that a sum of a number of nearest neighbor antenna elements that are the second antenna elements and a number of second-nearest neighbor antenna elements that are the second antenna elements for one of the first antenna elements of the second subset is different from the sum for another one of the first antenna elements of the second subset.

Example 2 provides the antenna apparatus according to example 1, where each of the first antenna elements is a single-band antenna element to support the wireless communication in the first direction only, and/or each of the second antenna elements is a dual-band antenna element to support both the wireless communication in the first direction and the wireless communication in the second direction.

Example 3 provides the antenna apparatus according to any one of examples 1-2, where a ratio of the first center frequency to the second center frequency is M/N, where each of M and N is smallest integer greater than zero that represents the ratio, and the arrangement includes a plurality of non-overlapping blocks (where each block includes a respective different set of antenna elements, i.e., none of the antenna elements belongs to more than one block), each block including a total of $N^2$ of the second antenna elements and a total of $M^2-N^2$ of the first antenna elements.

Example 4 provides the antenna apparatus according to example 3, where the antenna apparatus further includes a plurality of beamformers, a number of the beamformers is equal to a number of the blocks, each beamformer is coupled to only one of the blocks, each of the blocks is coupled to only one of the beamformers (i.e., individual ones of the beamformers correspond to different ones of the blocks in a 1:1 correspondence), and each beamformer includes a total of $M^2+N^2$ channels, where $M^2$ channels are for the wireless communication in the first direction and $N^2$ channels are for the wireless communication in the second direction.

Example 5 provides the antenna apparatus according to example 3, where the antenna apparatus further includes a plurality of first beamformers (e.g., Tx beamformers, when Tx band is higher than Rx band) and a plurality of second beamformers (e.g., Rx beamformers when Tx band is higher than Rx band), each of the first beamformers includes channels for the wireless communication in the first direction and is coupled to a different set of four antenna elements (e.g., to a different set of four closest antenna elements) that includes any combination of the first antenna elements and the second antenna elements, and each of the second beamformers includes channels for the wireless communication in the second direction and is coupled to a different set of four of the second antenna elements (e.g., to a different set of four closest second antenna elements).

Example 6 provides the antenna apparatus according to example 5, where each of the first beamformers is arranged substantially symmetrically with respect to the set of antenna elements coupled thereto.

Example 7 provides the antenna apparatus according to any one of examples 1-6, where each antenna element of the second subset (i.e., each antenna element that is not at the periphery of the arrangement of the antenna elements) has four nearest neighbor antenna elements.

Example 8 provides the antenna apparatus according to any one of examples 1-7, where each antenna element of the second subset (i.e., each antenna element that is not at the periphery of the arrangement of the antenna elements) has four second-nearest neighbor antenna elements.

Example 9 provides the antenna apparatus according to any one of examples 1-8, where the arrangement is such that the first antenna elements and the second antenna elements are arranged in a plurality of columns and rows, and each of the columns includes substantially the same number of the second antenna elements.

Example 10 provides the antenna apparatus according to example 9, where each of the rows includes substantially the same number of the second antenna elements.

Example 11 provides the antenna apparatus according to any one of examples 1-4, where the arrangement is such that the first antenna elements and the second antenna elements are arranged in a hexagonal array, and each diagonal of the hexagonal array includes substantially the same number of the second antenna elements.

Example 12 provides the antenna apparatus according to any one of examples 1-8, where the arrangement is such that the first antenna elements and the second antenna elements are arranged in a plurality of columns and rows, and a number of the second antenna elements in one of the columns is smaller than a number of the second antenna elements in another one of the columns.

Example 13 provides the antenna apparatus according to example 12, where the one of the columns only has one other column adjacent thereto (i.e., the one of the columns is at the periphery of the arrangement), and the other one of the columns has two other columns adjacent thereto (i.e., the other one of the columns is not at the periphery of the arrangement).

Example 14 provides the antenna apparatus according to any one of examples 12-13, where a number of the second antenna elements in one of the rows is smaller than a number of the second antenna elements in another one of the rows.

Example 15 provides the antenna apparatus according to example 14, where the one of the rows only has one other row adjacent thereto (i.e., the one of the rows is at the periphery of the arrangement), and the other one of the rows has two other rows adjacent thereto (i.e., the other one of the rows is not at the periphery of the arrangement).

Example 16 provides the antenna apparatus according to any one of examples 1-3, where each antenna element of the second subset has six nearest neighbor antenna elements.

Example 17 provides the antenna apparatus according to any one of examples 1-16, where the wireless communication in the first direction is a transmission (Tx) of Tx signals, and the wireless communication in the second direction is a receipt (Rx) of Rx signals.

Example 18 provides the antenna apparatus according to any one of examples 1-16, where the wireless communication in the first direction is a receipt (Rx) of Rx signals, and the wireless communication in the second direction is a transmission (Tx) of Tx signals.

Example 19 provides an antenna apparatus for supporting a wireless communication in a first direction in a band having a first center frequency and supporting a wireless communication in a second direction in a band having a second center frequency, the second center frequency being lower than the first center frequency, where the antenna apparatus includes a support structure and an antenna array including an arrangement of first antenna elements and second antenna elements over the support structure, where the first antenna elements are to support the wireless communication in the first direction without supporting the wireless communication in the second direction (e.g., the first antenna elements may be the single-band antenna elements 214 as described herein), the second antenna elements are to support both the wireless communication in the first direction and the wireless communication in the second direction (e.g., the second antenna elements may be the dual-band antenna elements 212 as described herein), and two of the first antenna elements that are not at a periphery of the arrangement have different numbers of nearest neighbor antenna elements that are the second antenna elements.

Example 20 provides the antenna apparatus according to example 19, where the antenna apparatus is the antenna apparatus according to any one of examples 1-18.

Example 21 provides an antenna apparatus for supporting a wireless communication in a first direction in a band having a first center frequency and supporting a wireless communication in a second direction in a band having a second center frequency, the second center frequency being lower than the first center frequency, where the antenna apparatus includes a support structure and an antenna array including an arrangement of first antenna elements and second antenna elements over the support structure, where the first antenna elements are to support the wireless communication in the first direction without supporting the wireless communication in the second direction (e.g., the first antenna elements may be the single-band antenna elements 214 as described herein), the second antenna elements are to support both the wireless communication in the first direction and the wireless communication in the second direction (e.g., the second antenna elements may be the dual-band antenna elements 212 as described herein), and two of the first antenna elements that are not at a periphery of the arrangement have different numbers of second-nearest neighbor antenna elements that are the second antenna elements.

Example 22 provides the antenna apparatus according to example 21, where the antenna apparatus is the antenna apparatus according to any one of examples 1-18.

Example 23 provides the antenna apparatus according to any one of examples 1-22, further including a plurality of beamformers, coupled to different ones of the first antenna elements and the second antenna elements.

Example 24 provides the antenna apparatus according to any one of examples 1-23, further including a plurality of UDC circuits, coupled to different ones of the first antenna elements and the second antenna elements.

Example 25 provides the antenna apparatus according to any one of examples 1-24, where the first antenna elements and the second antenna elements are antenna elements to support the wireless communication of circularly polarized signals.

Example 26 provides the antenna apparatus according to any one of examples 1-24, where the first antenna elements and the second antenna elements are antenna elements to support the wireless communication of linearly polarized signals.

Example 27 provides the antenna apparatus according to any one of examples 1-26, where the antenna apparatus is a satellite communication device.

Example 28 provides the antenna apparatus according to any one of examples 1-26, where the antenna apparatus is a wireless cellular communication device.

The invention claimed is:

1. An antenna apparatus for supporting a wireless communication in a first direction in a band having a first center frequency and supporting a wireless communication in a second direction in a band having a second center frequency, the second center frequency being lower than the first center frequency, the antenna apparatus comprising:
   a support structure; and
   an antenna array comprising antenna elements arranged on the support structure in an arrangement so that antenna elements of a first subset of the antenna elements are at a periphery of the arrangement and antenna elements of a second subset of the antenna elements are within the periphery,
   wherein:
   the antenna elements include first antenna elements and second antenna elements,
   each of the first antenna elements is to support the wireless communication in the first direction without supporting the wireless communication in the second direction,
   each of the second antenna elements is to support both the wireless communication in the first direction and the wireless communication in the second direction, and
   the arrangement is such that a sum of a number of all second antenna elements that are nearest neighbor second antenna elements and a number of all second antenna elements that are second-nearest neighbor second antenna elements for one of the first antenna elements that is in the second subset and has the second-nearest neighbor second antenna elements is different from the sum for another one of the first antenna elements that is in the second subset and has the second-nearest neighbor second antenna elements.

2. The antenna apparatus according to claim 1, wherein:
each of the first antenna elements is a single-band antenna element to support the wireless communication in the first direction only, and
each of the second antenna elements is a dual-band antenna element to support both the wireless communication in the first direction and the wireless communication in the second direction.

3. The antenna apparatus according to claim 1, wherein:
a ratio of the first center frequency to the second center frequency is M/N, where each of M and N is smallest integer greater than zero that represents the ratio, and
the arrangement includes a plurality of blocks, each block including a total of $N^2$ of the second antenna elements and a total of $M^2-N^2$ of the first antenna elements.

4. The antenna apparatus according to claim 3, wherein:
the antenna apparatus further includes a plurality of beamformers,
a number of the beamformers is equal to a number of the blocks,
each beamformer is coupled to only one of the blocks,
each of the blocks is coupled to only one of the beamformers, and
each beamformer includes a total of $M^2+N^2$ channels, where $M^2$ channels are for the wireless communication in the first direction and $N^2$ channels are for the wireless communication in the second direction.

5. The antenna apparatus according to claim 3, wherein:
the antenna apparatus further includes a plurality of first beamformers and a plurality of second beamformers,
each of the first beamformers includes channels for the wireless communication in the first direction and is coupled to a different set of four antenna that includes any combination of the first antenna elements and the second antenna elements, and
each of the second beamformers includes channels for the wireless communication in the second direction and is coupled to a different set of four of the second antenna elements.

6. The antenna apparatus according to claim 5, wherein:
each of the first beamformers is arranged substantially symmetrically with respect to the set of antenna elements coupled thereto.

7. The antenna apparatus according to claim 1, wherein:
each antenna element in the second subset has four nearest neighbor antenna elements.

8. The antenna apparatus according to claim 1, wherein:
each antenna element in the second subset has four second-nearest neighbor antenna elements.

9. The antenna apparatus according to claim 1, wherein:
the arrangement is such that the first antenna elements and the second antenna elements are arranged in a plurality of columns and rows, and
each of the columns includes substantially the same number of the second antenna elements.

10. The antenna apparatus according to claim 9, wherein:
each of the rows includes substantially the same number of the second antenna elements.

11. The antenna apparatus according to claim 1, wherein:
the arrangement is such that the first antenna elements and the second antenna elements are arranged in a hexagonal array, and
each diagonal of the hexagonal array includes substantially the same number of the second antenna elements.

12. The antenna apparatus according to claim 1, wherein:
the arrangement is such that the first antenna elements and the second antenna elements are arranged in a plurality of columns and rows, and
a number of the second antenna elements in one of the columns is smaller than a number of the second antenna elements in another one of the columns.

13. The antenna apparatus according to claim 12, wherein:
the one of the columns only has one other column adjacent thereto, and
the another one of the columns has two other columns adjacent thereto.

14. The antenna apparatus according to claim 12, wherein:
a number of the second antenna elements in one of the rows is smaller than a number of the second antenna elements in another one of the rows.

15. The antenna apparatus according to claim 14, wherein:
the one of the rows only has one other row adjacent thereto, and
the another one of the rows has two other rows adjacent thereto.

16. The antenna apparatus according to claim 1, wherein each antenna element in the second subset has six nearest neighbor antenna elements.

17. The antenna apparatus according to claim 1, wherein:
the wireless communication in the first direction is a transmission (Tx) of Tx signals, and
the wireless communication in the second direction is a receipt (Rx) of Rx signals.

18. The antenna apparatus according to claim 1, wherein:
the wireless communication in the first direction is a receipt (Rx) of Rx signals, and
the wireless communication in the second direction is a transmission (Tx) of Tx signals.

19. An antenna apparatus for supporting a wireless communication in a first direction in a band having a first center frequency and supporting a wireless communication in a second direction in a band having a second center frequency, the second center frequency being lower than the first center frequency, the antenna apparatus comprising:
an antenna array comprising an arrangement of first antenna elements and second antenna elements,
wherein:
the first antenna elements are to support the wireless communication in the first direction without supporting the wireless communication in the second direction,
the second antenna elements are to support both the wireless communication in the first direction and the wireless communication in the second direction, and
two of the first antenna elements that are not at a periphery of the arrangement have different numbers of all nearest neighbor antenna elements that are the second antenna elements.

20. An antenna apparatus for supporting a wireless communication in a first direction in a band having a first center frequency and supporting a wireless communication in a second direction in a band having a second center frequency, the second center frequency being lower than the first center frequency, the antenna apparatus comprising:
- an antenna array comprising an arrangement of first antenna elements and second antenna elements, wherein:
  - the first antenna elements are to support the wireless communication in the first direction without supporting the wireless communication in the second direction,
  - the second antenna elements are to support both the wireless communication in the first direction and the wireless communication in the second direction, and
  - two of the first antenna elements that are not at a periphery of the arrangement have different numbers of all second-nearest neighbor antenna elements that are the second antenna elements.

\* \* \* \* \*